United States Patent
Matsui et al.

(10) Patent No.: US 7,945,801 B2
(45) Date of Patent: *May 17, 2011

(54) SEMICONDUCTOR INTEGRATED CIRCUIT

(75) Inventors: Shigezumi Matsui, Nishitokyo (JP); Takashi Sato, Koganei (JP); Kazuyuki Sakata, Kodaira (JP); Tsuyoshi Yaguchi, Kodaira (JP); Kenzo Kuwabara, Kodaira (JP); Atsushi Nakamura, Fuchu (JP); Motoo Suwa, Saitama (JP); Ryoichi Sano, Kodaira (JP); Hisashi Shiota, Kokubunji (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 485 days.

This patent is subject to a terminal disclaimer.

(21) Appl. No.: 12/169,853

(22) Filed: Jul. 9, 2008

(65) Prior Publication Data
US 2008/0276112 A1 Nov. 6, 2008

Related U.S. Application Data

(63) Continuation of application No. 10/895,394, filed on Jul. 21, 2004, now Pat. No. 7,412,616.

(30) Foreign Application Priority Data

Sep. 3, 2003 (JP) ................................. 2003-310927

(51) Int. Cl.
*H04L 7/00* (2006.01)
(52) U.S. Cl. ..................................................... 713/401

(58) Field of Classification Search .................... 713/401
See application file for complete search history.

(56) References Cited

U.S. PATENT DOCUMENTS

| 5,867,432 | A | 2/1999 | Toda |
| 6,442,102 | B1 | 8/2002 | Borkenhagen et al. |
| 6,529,993 | B1 | 3/2003 | Rogers et al. |
| 6,570,944 | B2 | 5/2003 | Best et al. |
| 6,643,732 | B1 | 11/2003 | Shih |
| 6,707,723 | B2 | 3/2004 | Jeong |
| 6,760,856 | B1 | 7/2004 | Borkenhagen et al. |
| 2003/0099149 | A1 | 5/2003 | Braun et al. |

FOREIGN PATENT DOCUMENTS

| JP | 10-069326 A | 3/1998 |
| JP | 2001-014213 | 1/2001 |
| JP | 2001-014213 A | 1/2001 |
| JP | 2004-531981 T | 10/2004 |
| WO | WO 03/001732 | 1/2003 |

*Primary Examiner* — Thomas Lee
*Assistant Examiner* — Eric Chang
(74) *Attorney, Agent, or Firm* — Miles & Stockbridge P.C.

(57) ABSTRACT

A memory interface circuit is connectable to a DDR-SDRAM which outputs read data in synchronization with a data strobe signal together with the data strobe signal. A clock generator generates internal clock signals and memory clock signals supplied to the DDR-SDRAM. The memory interface circuit determines a delay of arrival of the data strobe signal relative to the corresponding internal clock signal by using a data strobe signal inputted in a read cycle with respect to the DDR-SDRAM, samples the arrived read data, based on a signal obtained by shifting the phase of the arrived data strobe signal, and synchronizes the sampled read data to the corresponding internal clock signal on the basis of the result of determination of the arrival delay.

5 Claims, 20 Drawing Sheets

FIG. 16

DELAY SET VALUES OF DELAY PASS

| step | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 1st |  |  |  |  |  |  |  |  |  |  |  |  |  |  |  |  | 1 |  |  |  |  |  |  |  |  |  |  |  |  |  |  |  |
| 2nd |  |  |  |  |  |  |  |  | 2 |  |  |  |  |  |  |  |  |  |  |  |  |  |  |  | 2 |  |  |  |  |  |  |  |
| 3rd |  |  |  |  | 3 |  |  |  |  |  |  |  | 3 |  |  |  |  |  |  |  | 3 |  |  |  |  |  |  |  | 3 |  |  |  |
| 4th |  |  | 4 |  |  |  | 4 |  |  |  | 4 |  |  |  | 4 |  |  |  | 4 |  |  |  | 4 |  |  |  | 4 |  |  |  | 4 |  |
| 5th |  | 5 |  | 5 |  | 5 |  | 5 |  | 5 |  | 5 |  | 5 |  | 5 |  | 5 |  | 5 |  | 5 |  | 5 |  | 5 |  | 5 |  | 5 |  | 5 |
| 6th | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 |

SEMICONDUCTOR INTEGRATED CIRCUIT

CROSS-REFERENCE TO RELATED APPLICATION

This application is a continuation of application Ser. No. 10/895,394 filed Jul. 21, 2004 now U.S. Pat. No. 7,412,616. This application also claims priority from Japanese Patent Application No. 2003-310927 filed Sep. 3, 2003, the content of which is hereby incorporated by reference into this application.

BACKGROUND OF THE INVENTION

The present invention relates to a semiconductor integrated circuit such as a data processor having a memory interface controller coupled to a double data rate (DDR) type synchronous memory, e.g., a DDR-SDRAM (Synchronous Dynamic Random Access Memory), and particularly to a technology for synchronizing read data sent from a synchronous memory to an internal clock on the memory interface controller side.

A microcomputer to which a memory interface controller enabling a DDR-SDRAM to be directly connected thereto is on-chipped, has been described in a patent document 1 (Japanese Unexamined Patent Publication No. 2001-14213). This is one in which the memory interface controller for controlling the DDR-SDRAM is provided inside a processor to control the DDR-SDRAM through the use of an operation clock frequency of the microcomputer. Synchronizing a clock signal for the DDR-SDRAM to an internal clock on the memory interface controller side has not yet discussed in detail.

SUMMARY OF THE INVENTION

Synchronization of the clock signal for the DDR-SDRAM to the internal clock on the memory interface controller side is enabled by feeding back a clock output from the memory controller to the SDRAM to the inside as it is and causing a PLL (Phase-Locked Loop) circuit to phase-match a clock signal supplied to the outside with an internal clock signal.

However, the technique of feeding back the output clock at the source or base has the possibility that since a reflection waveform of a signal is picked up, a malfunction will occur. It has been found out by the present inventors that there is a fear that the amount of delay of an I/O (Input/Output) buffer for supplying a clock to the DDR-SDRAM will vary greatly under best/worst conditions of process/temperature/power supply voltage, and will vary even about 2 cycles of a relevant reference clock signal inside a microprocessor. This becomes noticeable as a clock frequency for interface with an external synchronous memory becomes high. A semiconductor integrated circuit such as a microcomputer is not equipped with a circuit which effects timing control for internal synchronization on read data sent from the external DDR-SDRAM.

An object of the present invention is to provide a semiconductor integrated circuit capable of performing synchronization of signals fetched from an external synchronous memory with relatively high accuracy and stably without influences such as voltage reflection.

The above, other objects and novel features of the present invention will become apparent from the description of the present specification and the accompanying drawings.

Summaries of representative ones of the inventions disclosed in the present application will be explained in brief as follows:

[1]<<Delay Measurement of DQS Signal>>

A microcomputer according to the present invention comprises a memory interface circuit, a data processing circuit, and a clock generator. The memory interface circuit is capable of coupling to a double data rate type synchronous memory which outputs read data in synchronization with a data strobe signal together with the data strobe signal. The clock generator generates a plurality of internal clock signals supplied to internal circuits of the microcomputer and memory clock signals supplied to the synchronous memory on the basis of an externally input clock signal or a clock signal outputted from a crystal oscillator or the like connected to the microcomputer. The memory interface circuit determines a delay of arrival of the data strobe signal relative to the internal clock signal by using a data strobe signal inputted in a read cycle with respect to the synchronous memory, samples the arrived read data, based on a phase-shifted signal of the arrived data strobe signal, and synchronizes the sampled read data to the corresponding internal clock signal on the basis of the result of determination of the arrival delay.

As a further specific form, the memory interface circuit includes a circuit which determines a delay of arrival of the data strobe signal relative to the corresponding internal clock signal by using a data strobe signal inputted in a read cycle with respect to the synchronous memory, a circuit which generates a signal obtained by shifting the phase of the arrived data strobe signal, a circuit which samples the arrived read data, based on the phase-shifted signal, and a circuit which synchronizes the sampled read data to the corresponding internal clock signal on the basis of information about determination of the arrival delay.

According to the above means, the delay time is measured using the data strobe signal (DQS) outputted from the synchronous memory without matching the phases of the clock supplied to the external synchronous memory and the internal clock. Information (CNTsync) obtained therefrom is used to compensate for the timing for the signal fetched from the external memory.

Incidentally, when information per se about the delay time of the data strobe signal outputted upon data read is used for its data timing control, it becomes critical on a timing basis. Therefore, the measurement of the delay time of the data strobe signal is carried out occasionally or during a break of a bus cycle. The reflection of its information on an actual timing control mechanism is done during a period such as a memory refresh cycle or the like. When a data read cycle, which serves as source information for timing measurement, is not generated even once during the memory refresh cycle, a check is made at the start of the memory refresh cycle and a dummy read cycle is inserted.

Since the timing per se of the data strobe signal to be synchronized inside is measured in this way, the read data can be synchronized to the corresponding internal clock by using it information as it is. Also the timings provided to operate the external synchronous memory can be recognized without concern for a problem such as reflection. Since the measurement of the delay time is carried out using the signal (i.e., data strobe signal) per se to be actually timing-adjusted, a needless error is not introduced and a problem such as a critical pass does not occur either. Therefore, the operating margin can be brought to the greatest extent, and the operation can easily be stabilized. Further, since the timing measurement becomes more accurate, there is no need to have an extra design margin, thus making it possible to contribute to realization of an interface of a faster synchronous memory.

As a specific form of the present invention, a semiconductor integrated circuit has a memory controller which is connected to the memory interface circuit and performs access control on the synchronous memory.

The memory interface circuit controlled by the memory controller determines the arrival delay in a predetermined read cycle with respect to the synchronous memory and reflects a result of determination of the arrival delay on the synchronizing circuit during a predetermined period free of occurrence of the read cycle with respect to the synchronous memory. Considering the non-occurrence of the read cycle, the memory interface circuit may preferably generate a dummy read cycle for determining the arrival delay when no read cycle occurs during a predetermined refresh interval of the synchronous memory. Considering reset, the memory interface circuit may preferably generate a dummy read cycle for determining the arrival delay in response to power-on reset. The predetermined period free of the occurrence of the read cycle is a refresh cycle of the synchronous memory. The read cycle for determining the arrival delay can also be set so as to be carried out in a predetermined timing arbitrarily determined based on a result of determination in another read cycle in which delay determination has already been made.

[2]<<Simulation Measurement of Transfer Delay>>

A semiconductor integrated circuit according to another aspect of the present invention has a memory interface circuit, a data processing circuit, and a clock generator. The memory interface circuit is connectable to a double data rate type synchronous memory which outputs read data in synchronization with a data strobe signal together with the data strobe signal. The clock generator generates internal clock signals and memory clock signals supplied to the synchronous memory. Further, the memory interface circuit supplies a test pulse to an external terminal connected with a delay element which simulates a load of a transfer system of the memory clock signal, thereby to determine a delay of a transfer of the memory clock signal to the synchronous memory, samples the arrived read data, based on a signal obtained by shifting the phase of the arrived data strobe signal, and synchronizes the sampled read data to the corresponding internal clock signal on the basis of the result of determination of the transfer delay.

As a further specific form, the memory interface circuit includes a circuit which supplies a test pulse to an external terminal connected with a delay element which simulates a load of a transfer system of the memory clock signal, thereby to determine a delay of a transfer of the memory clock signal to the synchronous memory, a circuit which generates a signal obtained by shifting the phase of the arrived data strobe signal, a circuit which samples the arrived read data, based on the phase-shifted signal, and a circuit which synchronizes the sampled read data to the corresponding internal clock signal on the basis of information about determination of the transfer delay.

According to the above means, a delay time measurement system equivalent to a transfer system of the memory clock signal, which is different from an input system of the data strobe signal, is provided to recognize the arrival timing of the clock signal with respect to the external memory without matching the phases of the clock supplied to the external synchronous memory and the internal clock. The timing for the signal fetched from the external synchronous memory is compensated by information obtained from the delay time measurement system.

The capacitance equivalent to the input capacitance of an external clock terminal in the transfer system of the memory clock signal and the capacitance of each clock wiring on a wiring board with the synchronous memory or the like packaged thereon is disposed in the shortest distance to the equivalent delay time measurement system so as not to cause reflection and configured as the load for the equivalent delay time measurement system. Thus, the load equivalent to the original input system of the memory clock signal is applied and the same delay time as it can be measured. For example, a standard DDR-SDRAM is equipped with DLL (Delay Locked Loop) on a DDR-SDRAM and outputs signals like a data strobe signal and read data under the action thereof in synchronization with the crosspoint of memory clock signals (CK and /CK) supplied from the semiconductor integrated circuit side to the DDR-SDRAM. By measuring the timings for the memory clock signals (CK and /CK) supplied to the DDR-SDRAM, change timings provided for the signals like the read data and data strobe signal are determined, and they can be used as synchronization control information. The timings provided to operate the external synchronous memory can be recognized without concern for a problem such as reflection. Described strictly, the condition is that respective load components or delay components of the system of transfer of the clock signal between the semiconductor integrated circuit and the double data rate type synchronous memory and the simulation-measuring transfer system are substantially equal. Adjusting the equivalent capacitance constituting the equivalent delay time measurement system configured outside enables fine control or the like to the timings.

[3]<<Phase Shift>>

As a specific form of the present invention, the circuit for generating the phase-shifted signal is, for example, a circuit which performs the setting of a delay time in a variable delay circuit to thereby determine a required amount of phase shift with the cycle of the internal clock signal as the reference. It can flow a variation in the internal clock signal. The setting of the delay time may be started in a refresh cycle of the synchronous memory. If consideration is given to the case in which it is not completed during the refresh cycle, the variable delay circuit is provided as two sets, and they may be operated in such a manner that when the setting of a delay time in one of the variable delay circuits is performed in relation to each other, a required amount of phase shift with the cycle of the internal clock signal as the reference is determined using the delay time already determined in the other variable delay circuit.

According to the standard of the DDR-SDRAM, for example, there is a need to delay the data strobe signal (DQS) driven by the DDR-SDRAM 900 in phase in a data read cycle and simultaneously sample the driven read data (DQ). This type of 90° phase shift circuit is formed of combinations of delay cells low in delay time and selectors, and the calibration for timing is done by a state machine. Since it takes time to calculate the delay time when the delay cells low in delay amount are combined in multistage form, there is a possibility that calibration will not be completed during a memory refresh cycle. In order to avoid it, delay systems are internally provided in the form of two systems. By alternately using the two systems, the calibration functions without any problem even when the calibration goes beyond the memory refresh cycle.

It is possible to conceal timing for needless calibration and carry out high-precision timing control. Further, since no needless adjustment time is used while high-precision timing control is being performed, a high-performance stable system can be constructed while ensuring system performance.

Advantageous effects obtained by representative ones of the inventions disclosed in the present application will be explained in brief as follows:

Synchronization of signals fetched from an external synchronous memory can be performed with relatively high accuracy and stably without being subjected to influences such as voltage reflection.

Since a device according to the invention is not affected by signal reflection or the like from an external signal transmission line, it operates stably when built up as a system.

Since the calibration of a timing control mechanism is redone in a memory refresh cycle or the like, timing control is carried out following a variation in temperature or the like and hence a failure in operation is hard to occur in an end product.

BRIEF DESCRIPTION OF THE DRAWINGS

FIG. 16 is an explanatory diagram illustrating the order of selecting delay passes by the split-half method;

DETAILED DESCRIPTION OF THE PREFERRED EMBODIMENTS

<<Timing Control by DQS Signal Monitor>>

Figure 1:
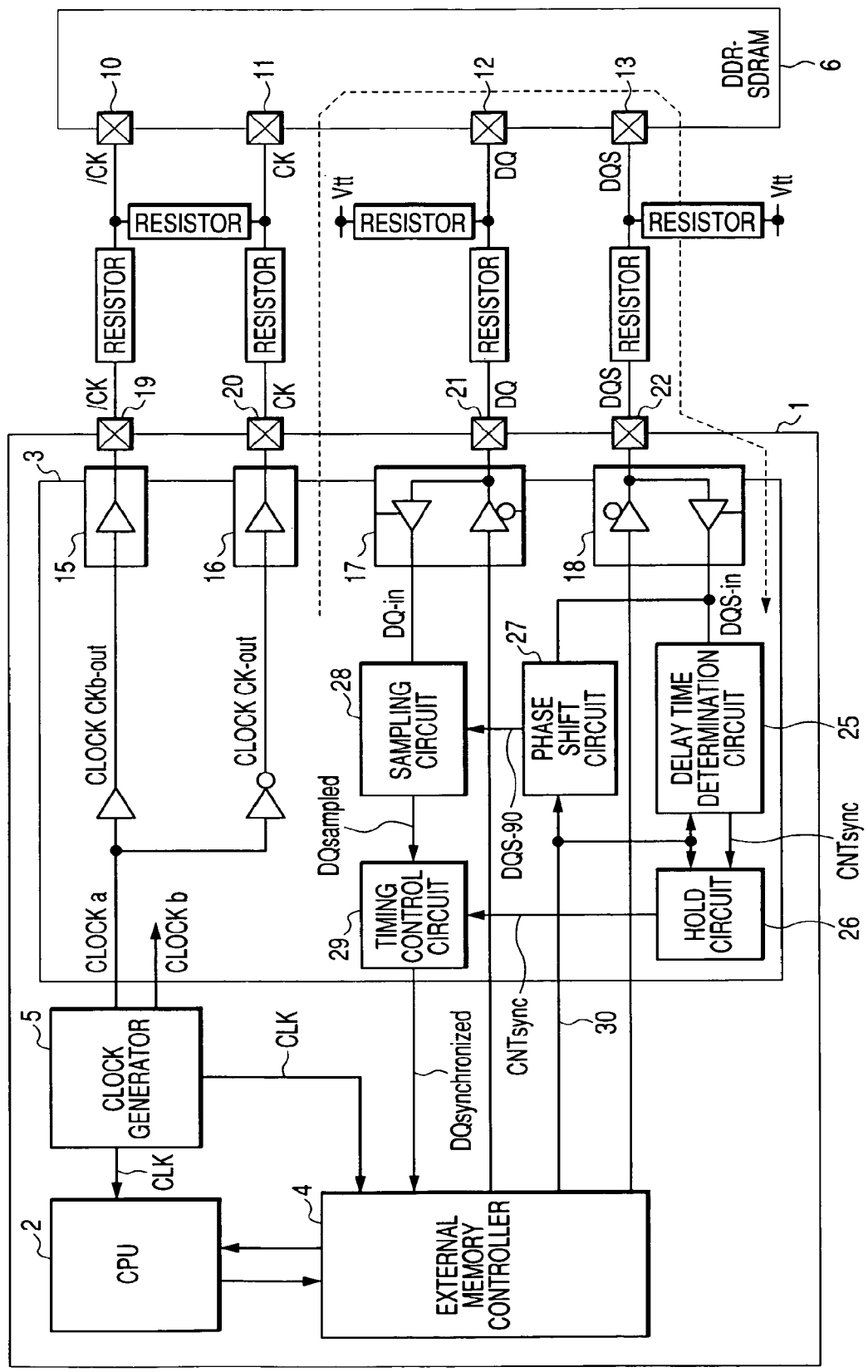
FIG. 1 is a block diagram of a data processor according to one example of the present invention.

A data processor according to one, embodiment of the present invention is shown in FIG. 1. Although not restricted in particular, the data processor 1 shown in the same figure is formed in one semiconductor substrate like monocrystal silicon by a complementary type MOS integrated circuit manufacturing technology or the like.

The data processor 1 includes a central processing unit (CPU) 2 used as a typically-shown data processing circuit, a memory interface circuit 3, an external memory controller 4 and a clock generator (clock generating circuit) 5. The CPU 2 has an instruction controller and an arithmetic unit. The instruction controller controls an instruction fetch and decodes a fetched instruction. The arithmetic unit performs a data operation or an address operation using the result of decoding of the instruction and an operand specified by the instruction to execute an instruction. The memory interface circuit 3 enables a DDR synchronous memory configured in another chip, e.g., a DDR-SDRAM 6 to be directly coupled thereto.

The memory interface circuit 3 is coupled to the external memory controller 4, which performs interface control for accessing the DDR-SDRAM 6. The DDR-SDRAM 6 is known per se and its details will not be described here. However, various control signals (commands) such as a low address strobe signal (/RAS), a column address strobe signal (/CAS), a write enable signal (/WE), etc. are latched on the rising edge of a clock signal CK used as a memory clock signal, and a plurality of input/output data DQ are transferred together with a data strobe signal DQS used as a bidirectional strobe signal. The data strobe signal DQS is set as an operation reference clock for data input/output upon read/write operations. Upon the read operation, the DDR-SDRAM 6 causes the edge (change point) of the data strobe signal DQS and the edge of read data to coincide with each other and outputs the same. Upon the write operation, the memory controller 4 places the edge of the data strobe signal DQS in the center of write data and outputs the same to the DDR-SDRAM 6. Input terminals 10 and 11 for clock signals CK and /CK (antiphase clock signal of clock signal CK), an input/output terminal 12 for the data DQ, and an input/output terminal 13 for the data strobe signal DQS are typically shown in the DDR-SDRAM 6 in FIG. 1. The clock generator 5 generates a clock a and a clock b corresponding to clock signals used for synchronous control of the DDR-SDRAM together with an operation reference clock signal CLK for the CPU 2 and the external memory controller 4. For instance, the clock b has a frequency equal to twice that of the clock a.

The memory interface circuit 3 has circuits for synchronizing the data strobe signal and read data DQ outputted from the DDR-SDRAM 6 to their corresponding internal clocks together with input/output buffers for directly connecting to the DDR-SDRAM 6 corresponding to an external circuit.

As the input/output buffers, output buffers 15 and 16 for the clock signals CK and /CK, an input/output buffer 17 for the data DQ, and an input/output buffer 18 for the data strobe signal DQS are typically illustrated. The output buffers 15 and 16 output the clock signals CK and /CK from clock output terminals 19 and 20 to the outside. The input/output buffer 17 is connected to a data terminal 12 of the DDR-SDRAM 6 through an external terminal 21. The input/output buffer 18 is connected to a strobe terminal 13 of the DDR-SDRAM 6 through an external terminal 22. Although resistors are inserted into required points of wirings for connecting the DDR-SDRAM 6 to the data processor 1, this is described with a configuration equivalent to SSTL-2/class-1 as one example and no particular limitation is imposed thereon. Load components or delay components in a system for transfer of the clock signal CK (/CK) between the data processor 1 and the DDR-SDRAM 6 and a system for transfer of the data strobe signal therebetween are substantially equal to each other.

As the circuits for synchronizing the data strobe signal DQS and the read data DQ to the internal clocks, there are provided a delay time determination circuit 25, a hold circuit 26, a phase shift circuit 27, a sampling circuit 28 and a timing control circuit 29.

The delay time determination circuit 25 counts or measures an arrival time interval of the data strobe signal DQS per se to synchronize the signals DQS and DQ outputted from the DDR-SDRAM 6 to the internal clocks. A delay time (system of DQS-in) from the input/output buffer 18 connected to the DQS terminal 22 to the delay time determination circuit 25 and the phase shift circuit 27, and a delay time (system of DQ-in) from the input/output buffer 17 connected to the DQ terminal 21 to the sampling circuit 28 are set so as to be substantially identical (clock skew (Skew)≈0). The delay time determination circuit 25 measures the arrival time interval (delay time) of the signal DQS-in with the internal clock as the reference. The delay time determination circuit 25 determines in which timing DQS changes to 1, using, for example, both the rising edge and falling edge of the clock b which is faster than the clock a for defining an operation cycle of the DDR-SDRAM 6 and has, for example, a period equivalent to twice that of the clock a, thereby measuring the arrival time interval (delay time) of the signal DQS-in. Incidentally, the measurement for determination of the delay time may preferably be carried out when a read bus cycle is not continuous, in such a manner that the false or erroneous edge is not recognized where the changed edge of DQS is continuous.

The delay time of DQS measured by the delay time determination circuit 25 is set to the hold circuit 26 as synchronization control information CNTsync during breaks of a bus cycle, e.g., during a memory refresh cycle period and during a memory write cycle. The set synchronization control information CNTsync is used in memory read cycles subsequent to the above. Instructions for the operation of measurement of the delay time by the delay time determination circuit 25 are given by, for example, a calibration start instruction signal 30 outputted from the external memory controller 4.

The phase shift circuit 27 is configured as a variable phase shift circuit using a variable delay circuit and performs a 90° phase shift with the cycle of the clock b as the reference. Therefore, the phase shift circuit 27 needs to effect delay setting (delay time adjustments) on the variable delay circuit. The delay time adjustments are made when no memory read cycle occurs, e.g., during the memory refresh cycle and the memory write cycle or the like. For example, their operation instructions are given by the calibration start instruction signal 30 outputted from the external memory controller 4. The 90° phase-shifted data strobe signal DQS-in is represented as DQS-90. Incidentally, the phase shift circuit 27 may be configured in such a manner that the delay time is always adjusted to reach 90° by using DLL or the like.

The sampling circuit 28 samples the read data DQ, using both the rising edge and falling edge of DQS delayed by 90° by the phase shift circuit 27.

The timing control circuit 29 has a plurality of paths or passes which make different the serial numbers of stages of flip-flops that perform latch operations according to positive-phase and negative-phase clocks of the clock b. One pass is selected from these passes by synchronization control information CNTsync. Thus, the timing control circuit 29 synchronizes the data DQ (DQsampled) sampled by the sampling circuit 28 to its corresponding internal clock b in accordance with the synchronization control information CNTsync measured by the delay time determination circuit 25, sequentially updated during the breaks of the bus cycle and retained in the hold circuit 26.

Figure 2:
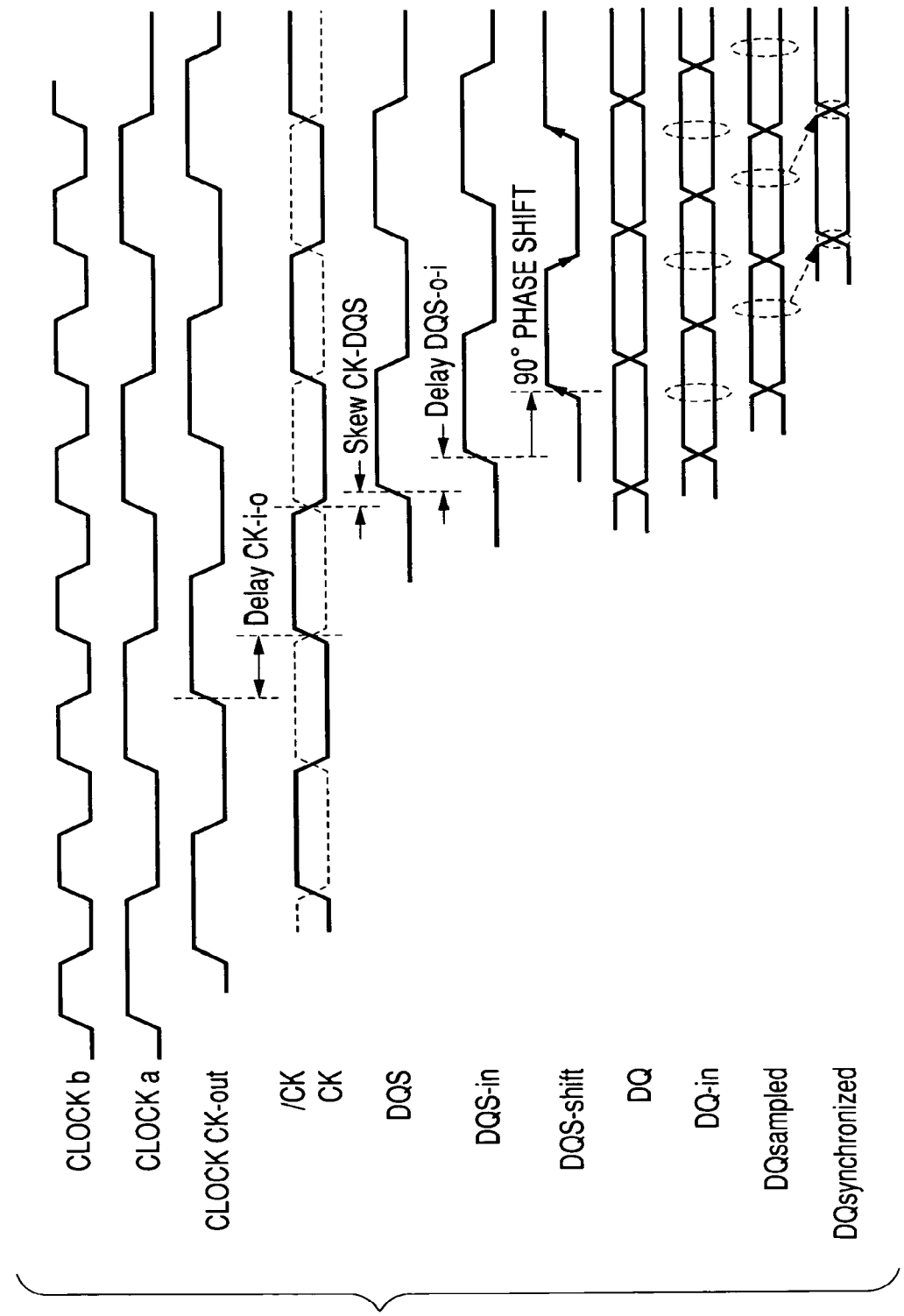
FIG. 2 is a timing chart for describing a synchronization operation based on monitoring of a DQS signal.

A timing chart for describing a synchronization operation based on monitoring of the data strobe signal DQS is shown in FIG. 2. In FIG. 2, a Delay CK-i-o designates a delay time from the end of the crosspoint of clocks CKb-out (/CK-out) and CK-out matched in timing to each of the CK terminals 10 and 11 of the DDR-SDRAM 6 via the clock buffers 15 and 16. The crosspoint of the clocks CK and /CK at the terminals 10 and 11 results in reference timing for each of the data strobe signal DQS and data DQ. A Skew CK-DQS designates the difference between the crosspoint of the clocks CK and /CK and change timing for each of the signals DQ and DQS in the DDR-SDRAM 6 connected to the outside. The general-purpose DDR-SDRAM 6 has a DDL circuit built in the output stage of the data strobe signal DQS and is configured so as to output DQS in synchronization with the clocks CK and /CK at the terminals 10 and 11. Therefore, the Skew CK-DQS is approximately ±subnano seconds. In the configuration shown in FIG. 1, however, the Skew CK-DQS is not necessarily set to a small value. If the value thereof is a short period of time and remains unchanged, then the value of DQS necessary for synchronization is obtained. Therefore, no problem arises in particular and synchronization information can be obtained. A Delay DQS-o-i designates a delay time from the DQS terminal 22 to each of the delay time determination circuit 25 and the phase shift circuit 27 via the buffer 18.

The DQsampled is one obtained by sampling the data DQ-in sent from the DQ terminal 21 via the buffer 17 in accordance with the 90° phase-shifted signal DQS-90.

Data DQSsynchronized is data obtained by synchronizing the data DQsampled to its corresponding internal clock (clock b) by the timing control circuit 29 in accordance with the output of the hold circuit the synchronization control information calculated by the delay time determination circuit 25.

Figure 3:
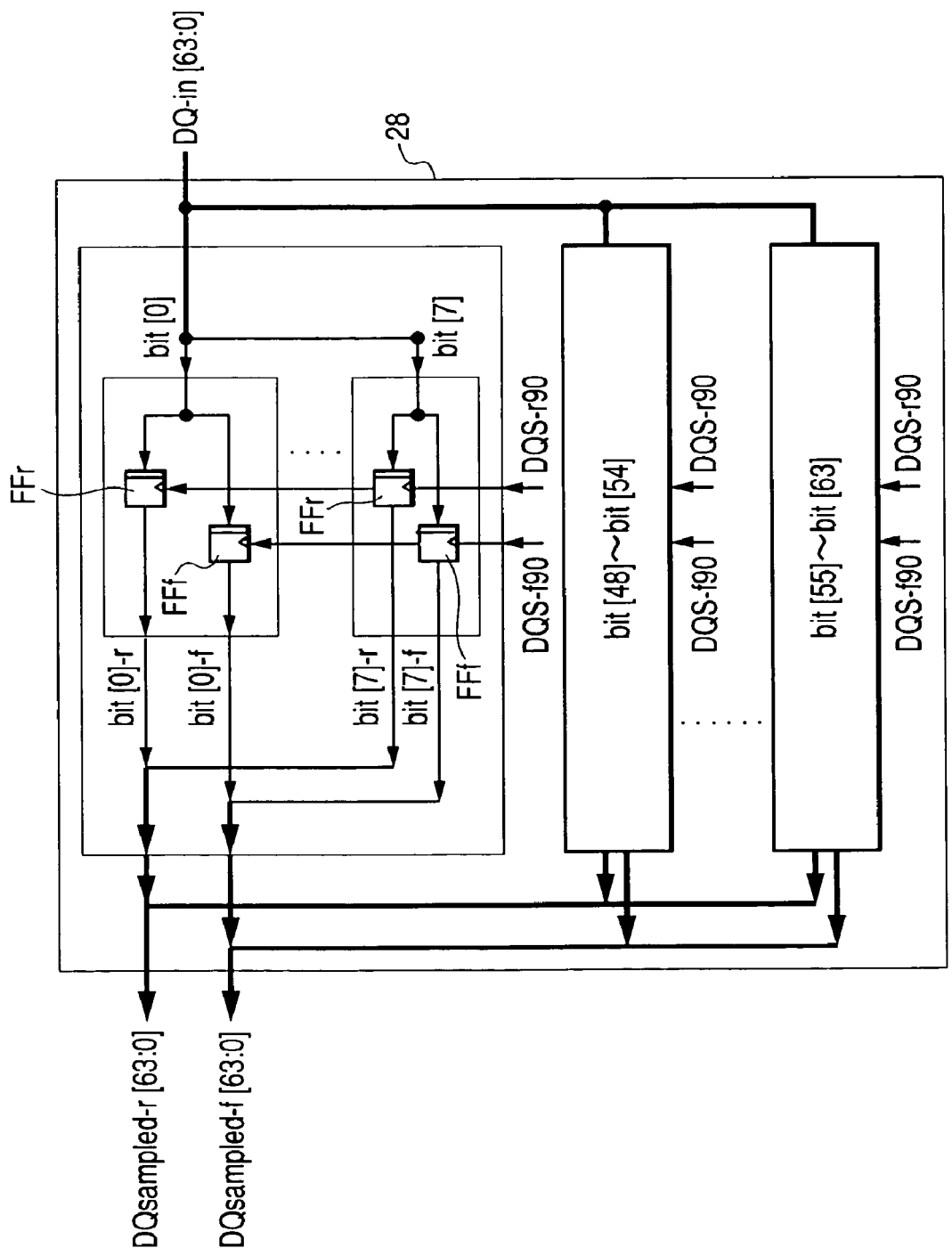
FIG. 3 is a block diagram showing a specific example of a sampling circuit.

A specific example of the sampling circuit 28 is shown in FIG. 3. Data DQ is configured as 64 bits, for example. The input is defined as DQ-in [63:0] and is latched into discrete FFr and FFf on the rise edge and fall edge of the 90° phase-shifted signal DQS-90 with respect to individual bits and subjected to sampling. DQS-f90 is a fall edge sync pulse of the 90° phase-shifted signal DQS-90, and DQS-r90 is a rise edge sync pulse of the 90° phase-shifted signal DQS-90, respectively. The sampling circuit 28 outputs data as data DQsampled-r[63:0] synchronized on the rise edge and data DQsampled-f[63:0] synchronized on the fall edge.

Figure 4:
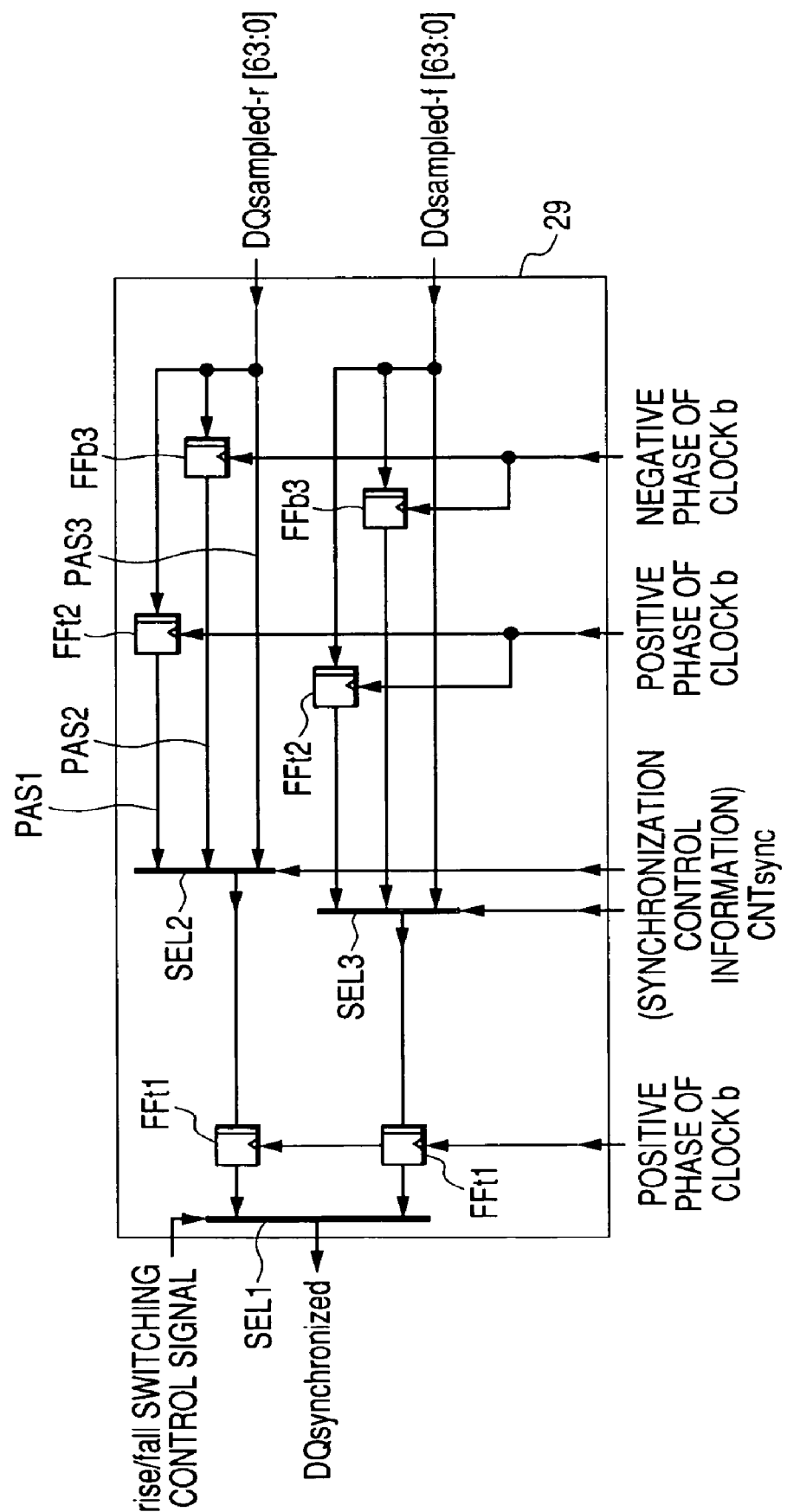
FIG. 4 is a block diagram depicting a specific example of a timing control circuit.

A specific example of the timing control circuit 29 is shown in FIG. 4. The timing control circuit 29 synchronizes the data DQsampled-r[63:0] and DQsampled-f[63:0] outputted from the sampling circuit 28 to the internal clock b in accordance with the synchronization control information CNTsync by variable delay FIFO. An FFt1 is a flip-flop which performs a latch operation on the rise edge of a positive phase clock of the clock b, an FFt2 is a flip-flop which performs a latch operation on the rise edge of the positive phase clock of the clock b. An FFb3 is a flip-flop which performs a latch operation on the rise edge of an antiphase or positive-phase clock of the clock b. SEL1, SEL2 and SEL3 are selectors respectively. The selectors SEL2 and SEL3 are capable of selecting passes PAS1, PAS2 and PAS3 in accordance with the synchronization control information CNTsync outputted from the hold circuit 26. The selector SEL1 alternately selects the inputs in synchronization with rise/fall switching control signal. The selector SEL1 performs switching to the selection of the inputs in accordance with high and low levels of a clock a, for example. When the attainment of the data DQ is made fastest to the internal clock in comparison with the delay time determined by the delay time determination circuit 25, the pass PAS1 is selected and hence the outputs from the selectors SEL2 and SEL3 are synchronized with the internal clock b with being delayed by 1 cycle of the clock b. When the attainment of the data DQ is delayed little more, the pass PAS2 is selected and delayed by a ½ cycle of the clock b. When the attainment of the data DQ is more delayed, the pass PAS3 is selected and used without an extra delay. The outputs of the selectors SEL2 and SEL3 are synchronized with the clock b and latched in the FFt1, whereby data DQsynchronized is supplied to a subsequent stage as data synchronized with the clock b.

Figure 5:
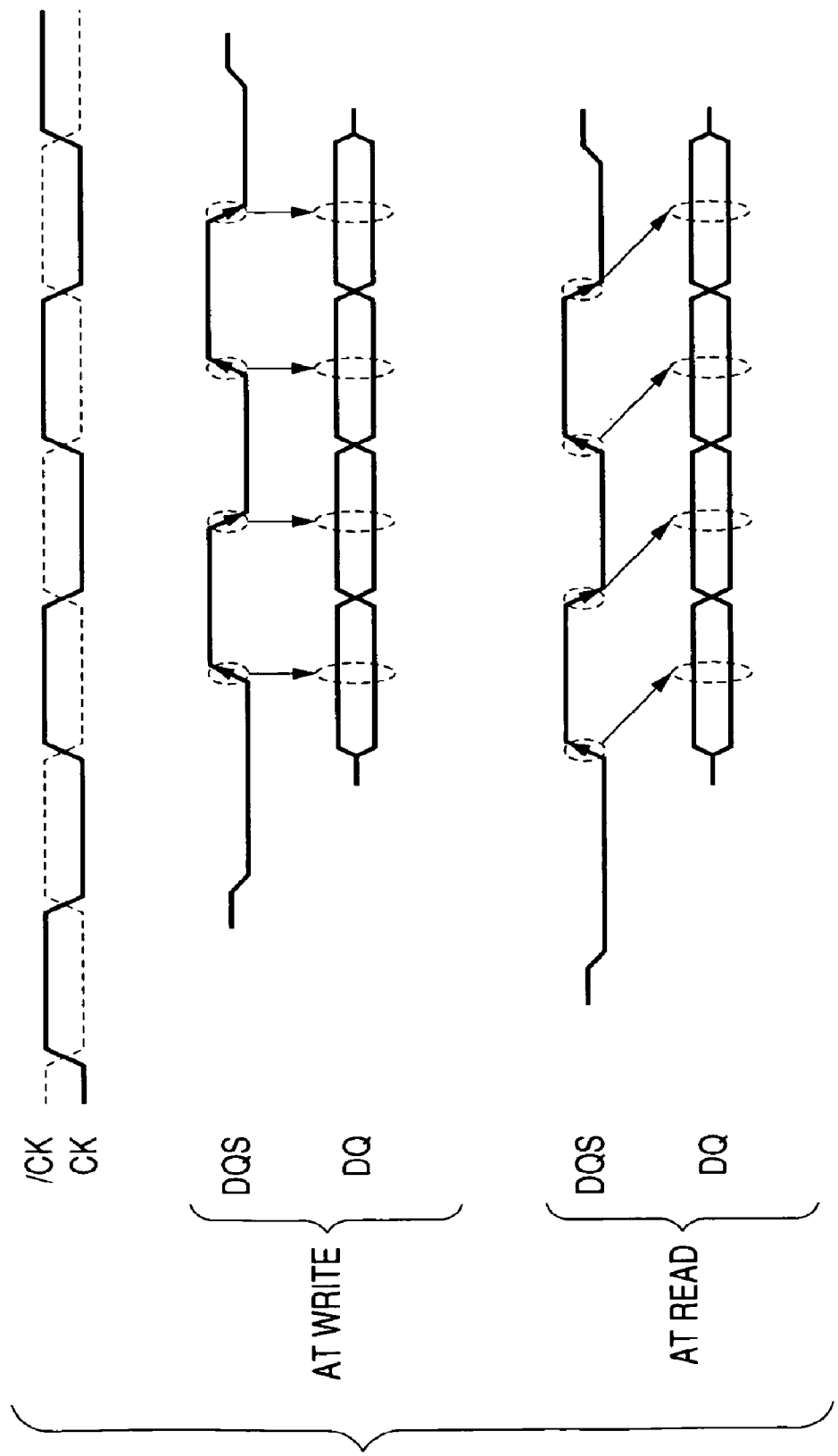
FIG. 5 is a timing chart showing a relationship between data DQ and data strobe signals DQS at a write access and a read access with respect to a DDR-SDRAM.

A relationship between data DQ and data strobe signals DQS at a write access and a read access with respect to the DDR-SDRAM is shown in FIG. 5. Upon the write access, the data strobe signal DQS is outputted with a phase delay of 90° with respect to the data DQ. The DDR-SDRAM 6, which receives it, samples data DQ in synchronism with the edge of the data strobe signal DQS. Upon the read access, the DDR-SDRAM 6 outputs data DQ and a data strobe signal DQS simultaneously. As described above, the interface circuit 3 performs sampling of data DQ in accordance with the 90° phase-delayed data strobe signal DQS-90 in response to those.

Figure 6:
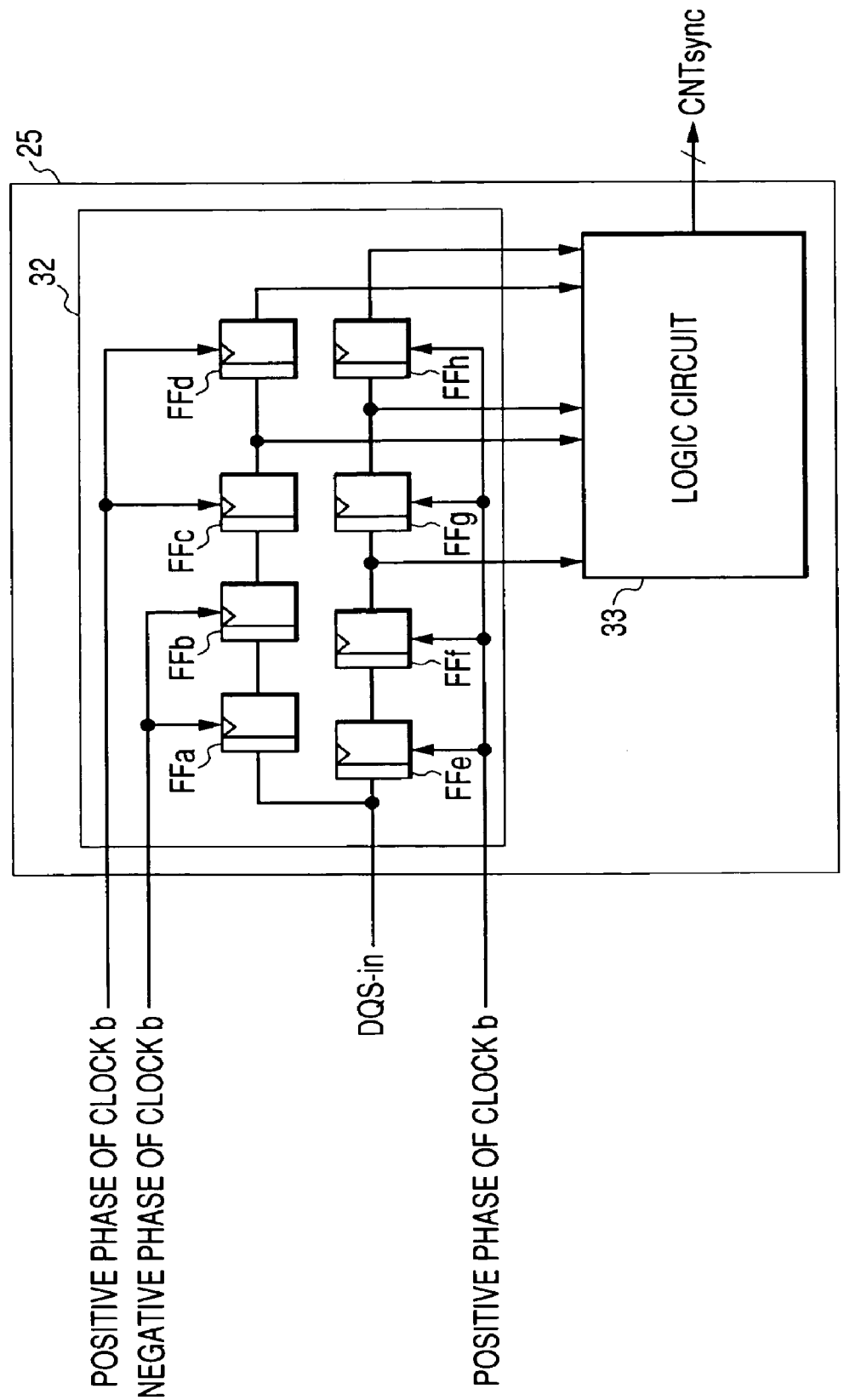
FIG. 6 is a block diagram depicting one example of a delay time determination circuit.

One example of the delay time determination circuit 25 is shown in FIG. 6. The delay time determination circuit 25 comprises a series circuit 32 of flip-flops and a logic circuit 33 which determines each of delay times from the output thereof and outputs 2-bit synchronization control information CNTsync. The series circuit 32 includes a 4-stage series circuit comprising flip-flops FFa, FFb, FFc and FFd, and a 4-stage series circuit comprising flip-flops FFe, FFf, FFg and FFh. The flip-flops FFa and FFb perform latch operation on the rise edge of an antiphase or negative-phase clock (negative phase of clock b) of a clock b. The flip-flops FFc through FFh respectively perform latch operations on the rise edge of a positive-phase clock (clock b) of the clock b. The logic circuit 33 inputs the outputs of the flip-flops FFc, FFd, FFf, FFg and FFh, determines in which timing fetched data DQS-in is changed to 1 with respect to the clock b, and outputs the result of determination to the hold circuit 26 as the 2-bit synchronization control information CNTsync.

Figure 7:
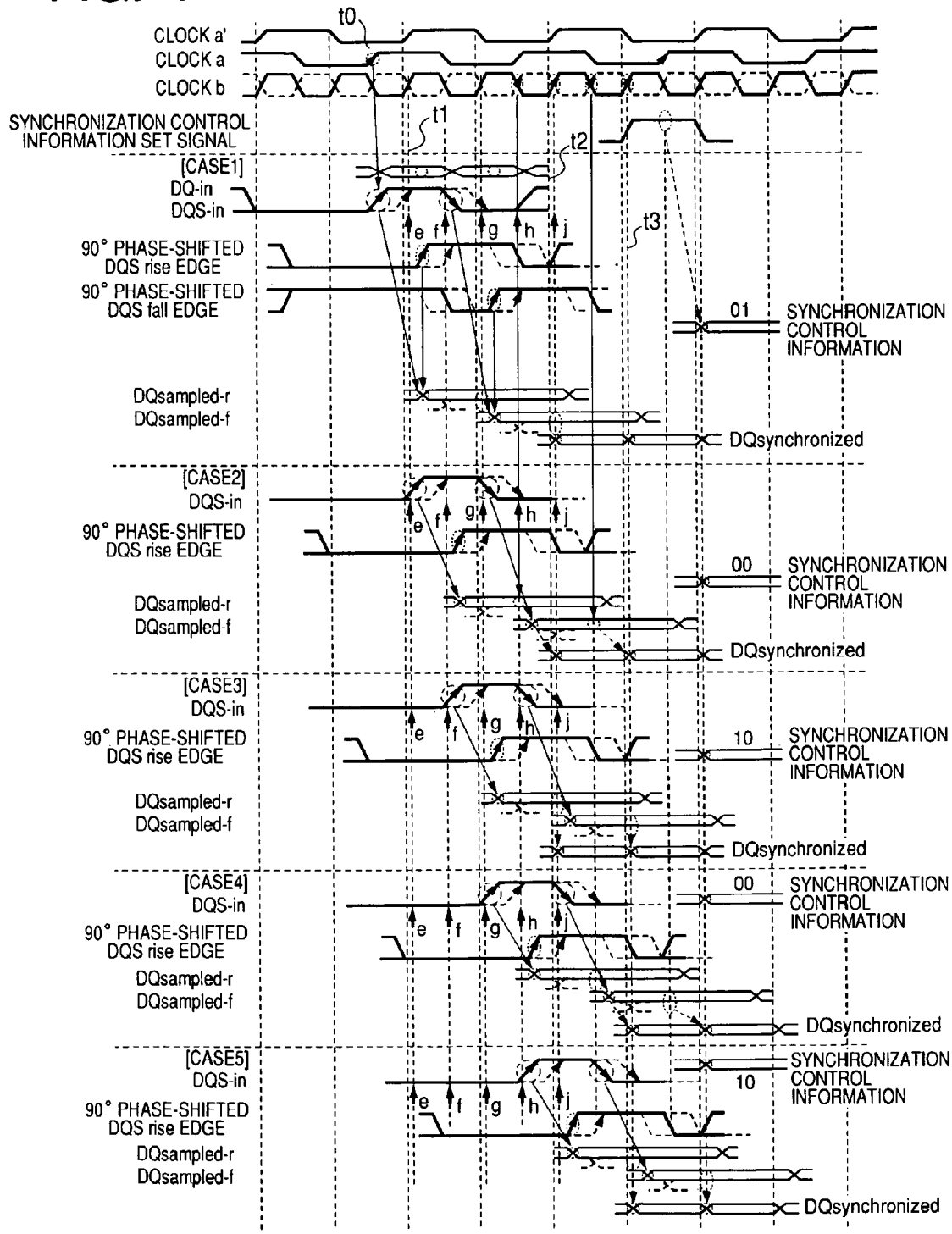
FIG. 7 is a timing chart illustrating determining operations by a logic circuit of the delay time determination circuit.

FIG. 7 shows timings provided for operations for determination by the logic circuit 33. Determination forms are classified into CASEs 1 to 5. Five types of cases are considered according to arrival times (delay times) of a signal DQS-in. Considering t0 of a clock a as the reference, the logic circuit 33 determines an input timing in which the input DQS-in is brought to 1 (high level), in accordance with five timings of e, f, g, h and j shown in the figure on the basis of the outputs of the FFc, FFd, FFf, FFg and FFh. In the CASE 1, 1 of the signal DQS-in is detected with the timing of e. The timing in which synchronized data DQsynchronized is outputted from the timing control circuit 29, appears after 2.5 cycles of a clock b with a time t0 as a starting point (time t2). This is because 0.5 cycle of the clock b is necessary for the operation of the sampling circuit 28 and 2.0 cycles of the clock b are necessary for the output operation of the timing control circuit 29. Since 1 of the DQS-in is detected with the timing of e, sampled data DQsampled obtained immediately after a time t1 is delayed by 2 cycles of the clock b by the timing control circuit 29, after which it is outputted as synchronized data DQsynchronized at the time t2. Other CASE 2 designates where 1 of the DQS-in is detected with the timing of f. The CASE 3 designate where 1 of the DQS-in is detected with the timing of g. The CASE 4 designates where 1 of the DQS-in is detected with the timing of h. Further, the CASE 5 designates where 1 of the DQS-in is detected with the timing of j. In the case of the CASE 4 and CASE 5 in particular, 1 of the DQS-in is detected beyond 1 cycle of the clock a from the time t0. Therefore, the determining operation cannot be completed in 2.5 cycles of the clock b in this case, and hence synchronized data DQsynchronized is outputted from the timing control circuit 29 at a time t3.

Figure 8:
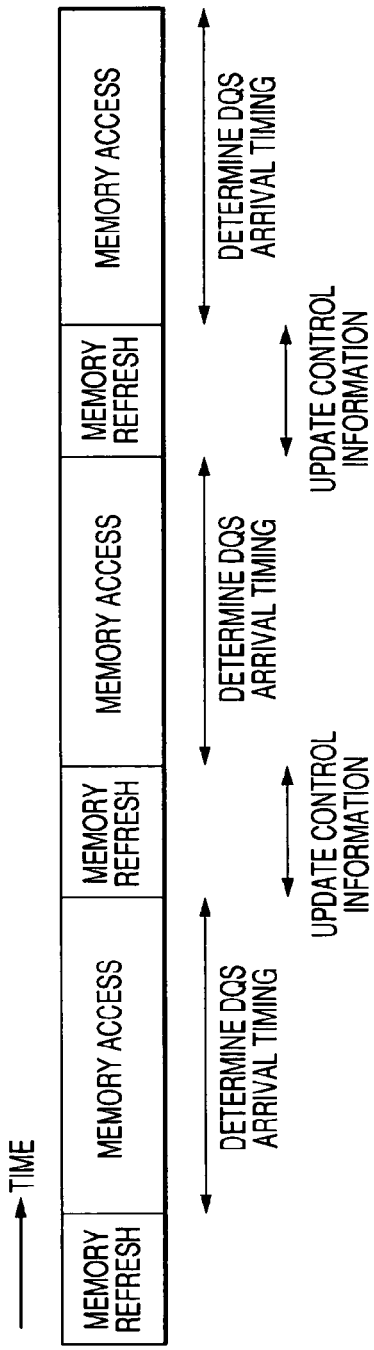
FIG. 8 is an explanatory diagram showing a representative relationship between the operation degrees of renewal of synchronization control information, based on delay time determining operations and the results of determination thereof, and memory access operations.

A representative relationship between the operation degrees of renewal of synchronization control information, based on delay time determining operations and the results of determination thereof, and memory access operations is shown in FIG. 8. In the DDR-SDRAM 6, memory refreshes set every predetermined cycles are needed and normal memory accesses are performed during periods other than those. During a read access in the period of the memory access, the delay time determination circuit 25 makes a delay time decision as to a strobe signal DQ (determines DQS arrival timing). The renewal (updating of control information) of the value held in the hold circuit, based on the result of determination may be carried out during a memory refresh in which no memory access occurs, or during a write access in which no read cycle occurs.

Figure 9:
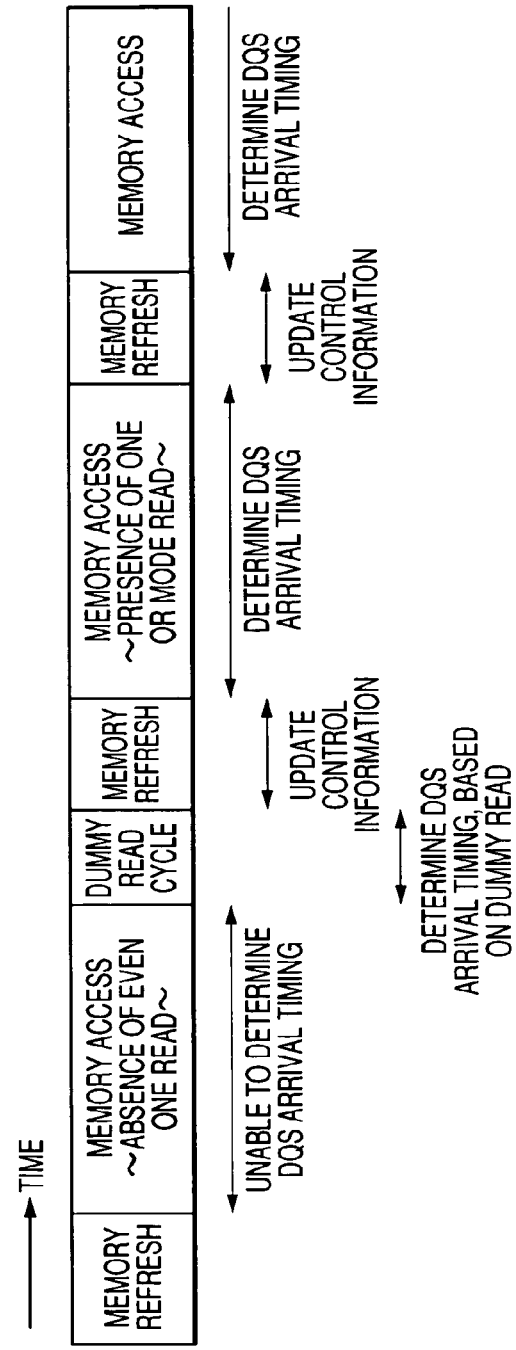
FIG. 9 is an explanatory diagram showing another relationship between the operation degrees of renewal of synchronization control information, based on delay time determining operations and the results of determination thereof, and memory access operations.

Another relationship between the operation degrees of renewal of synchronization control information CNTsync, based on delay time determining operations and the results of determination thereof, and memory access operations is shown in FIG. 9. It is considered that a memory read access does not occur even once during a memory refresh interval. In such a case, the synchronization control information CNTsync held in the hold circuit 26 cannot be updated. In order to avoid the use of the too-old synchronization control information CNTsync held in the hold circuit 26, a dummy read access cycle is automatically generated immediately before the start of a memory refresh cycle when the memory read access is not generated even once during the memory refresh interval. Thus, it is possible to avoid the synchronization control information CNTsync from getting old excessively.

Figure 10:
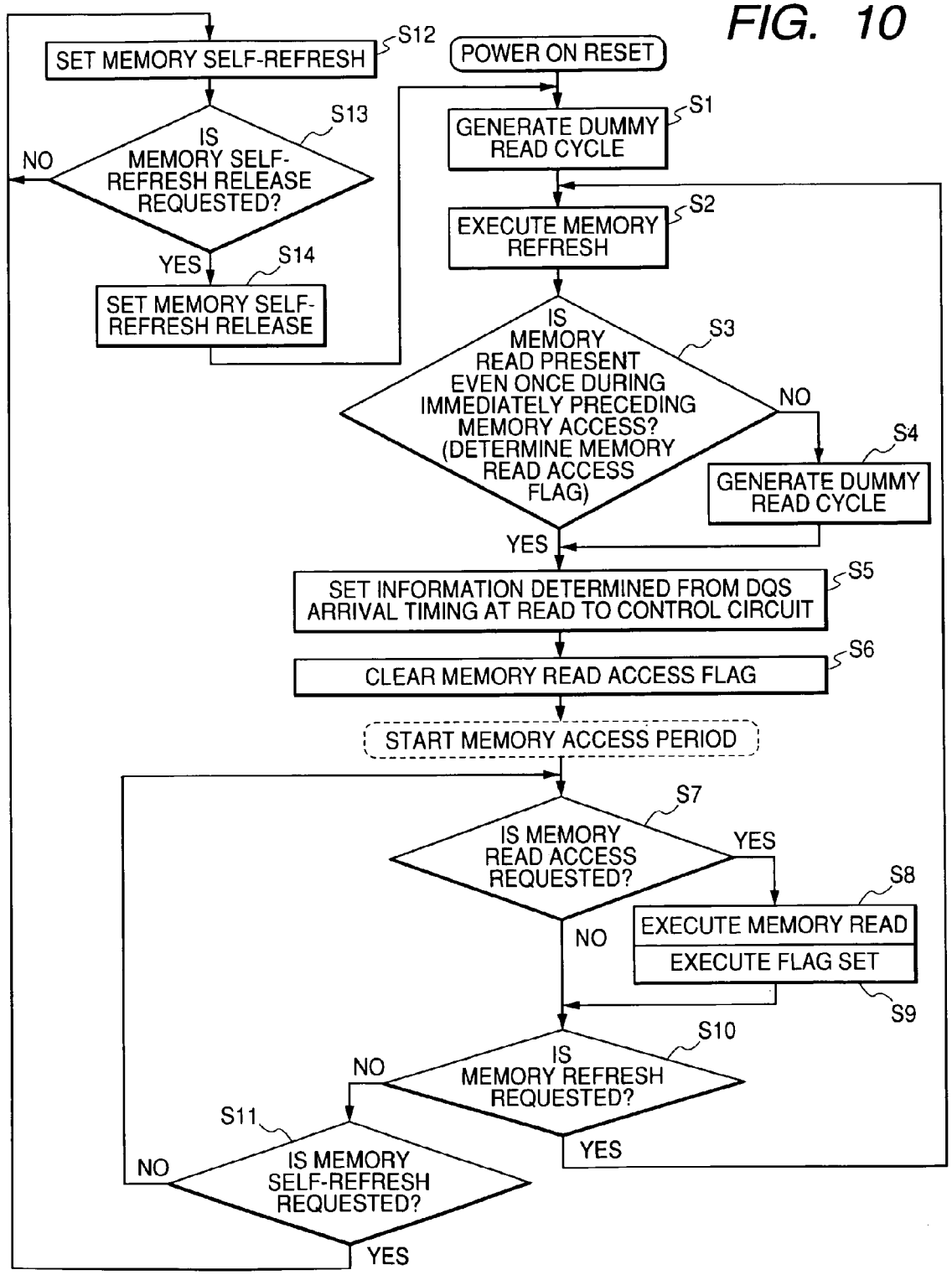
FIG. 10 is an operation control flow having taken into consideration a timing control operation by the delay time determination circuit.

An operation control flow having taken into consideration a timing control operation, using the delay time determination circuit 25 is shown in FIG. 10. A dummy read cycle is generated following power-on reset, and a determining operation is done by the delay time determination circuit 25 (S1). Immediately after the above process, a memory refresh is executed (S2). Next, the delay time determination circuit 25 determines a memory read access flag (S3). When a memory read cycle does not exist even once during an immediately preceding refresh interval, a dummy read cycle is generated in a manner similar to Step S1 to thereby make a delay time decision (S4). Then, the value held in the hold circuit 26 is updated based on synchronization control information CNTsync obtained in Step S1 or S4 (S5). Further, the delay time determination circuit 25 clears the memory read access flag (S6) and enters a memory access operation period. The delay time determination circuit 25 determines whether a read access is requested (S7). If the read access request is found to be present, then the delay time determination circuit 25 executes memory read (S8) and sets a read access flag (S9). The delay time determination circuit 25 determines the presence or absence of a refresh request in mid course (S10). If the refresh request is made, then the delay time determination circuit 25 returns to Step S2. If no refresh request is made, then the delay time determination circuit 25 determines the presence or absence of the self-refresh request (S11). If no, the delay time determination circuit 25 returns to Step S7. When the self-refresh request is made, the delay time determination circuit 25 sets a memory self refresh (S12) and performs a self refresh until the memory self-refresh request is released (S13 and S14).

According to the above means, the delay time is measured using the data strobe signal DQS outputted from the DDR-SDRAM 6 without matching the phases of the clock CK and internal clock supplied to the DDR-SDRAM 6. Information obtained therefrom is used to compensate for the timing for the signal fetched from the DDR-SDRAM 6.

Measuring the delay time of the data strobe signal DQS is carried out occasionally or during a break of a bus cycle. The reflection of its information on an actual timing control mechanism is done during the period such as the memory refresh cycle or the like. Therefore, it is possible to restrain the timing provided to reflect the measurement of the delay time and the result of measurement from becoming critical, as compared with the case in which the information per se about the delay time of the data strobe signal outputted upon data read is used for data timing control. When a data read cycle, which serves as source information for timing measurement, is not generated even once during the memory refresh cycle, a check is made at the start of the memory refresh cycle and a dummy read cycle is inserted.

Since the timing DQS per se of the data strobe signal to be synchronized inside is measured in this way, the read data can be synchronized to the corresponding internal clock by using it information as it is. Also the timings provided to operate the DDR-SDRAM 6 can be recognized without concern for a problem such as reflection. Since the data strobe signal DQS outputted from the DDR-SDRAM 6 is measured using the signal DQS per se to be actually timing-adjusted, a needless error is not introduced and a problem such as a critical pass does not occur either. Therefore, the operating margin can be brought to the greatest extent, and the operation can easily be stabilized. Further, since the timing measurement becomes more accurate, there is no need to have an extra design margin, thus making it possible to contribute to realization of an interface of a faster DDR-SDRAM.

<<Timing Control Circuit Based on Dummy Capacitance>>

Figure 11:
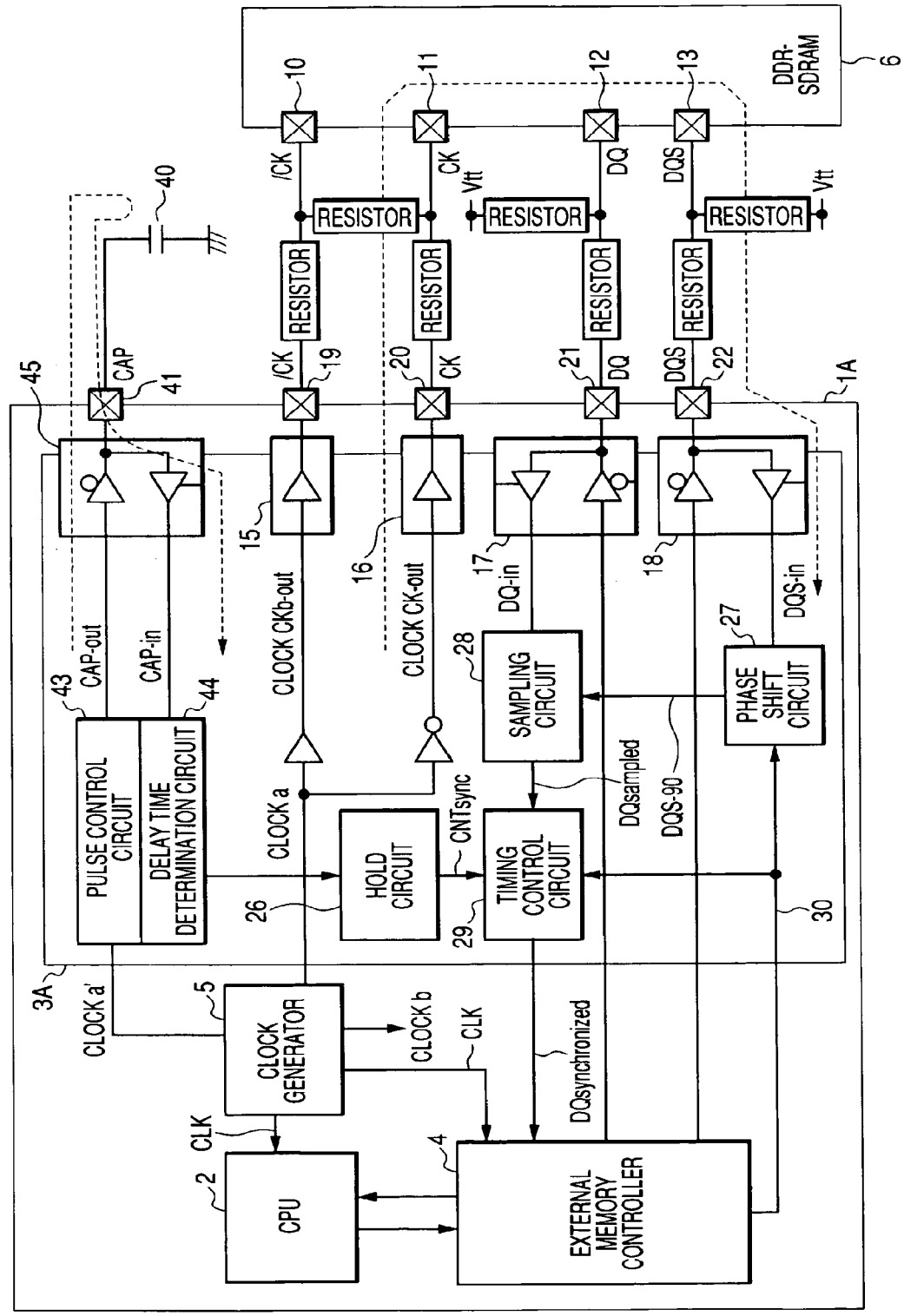
FIG. 11 is a block diagram showing another example of the data processor.

Another example of the data processor is shown in FIG. 11. The data processor 1A shown in the same figure is different from the example shown in FIG. 1 in that internal synchronization to read data outputted from a DDR-SDRAM 6 is performed by dummy capacitance. That is, the present example intends to determine timings for clocks CK and /CK at input terminals 10 and 11 of the DDR-SDRAM 6, which serve as reference clocks for DQS and DQ signals outputted from the DDR-SDRAM 6, with a view toward synchronizing the DQS and DQ signals to an internal clock b. To this end, there is provided a measuring terminal (CAP terminal) 41 connected with a capacitor 40 used as a delay element or a load element equivalent to the capacitance corresponding to the sum of, for example, a transmission load of a clock signal from a terminal 20 to the clock terminal 11 of the DDR-SDRAM 6, e.g., the input capacitance of the terminal 11 of the DDR-SDRAM, and a capacitance component of each clock wiring. In order to suppress the influence of reflection, the distance between the CAP terminal 41 and the capacitor 40 may preferably be shortened to the utmost. A memory interface circuit 3A is provided with a pulse control circuit 43 and a delay time determination circuit 44. The pulse control circuit 43 outputs a test pulse CAP-out to the CAP terminal 41 via an input/output buffer 45. A change in the test pulse CAP-out is delayed by the capacitor 40 constituting the load, and a delay time determination circuit 44 inputs a signal CAP-in returned from the input/output buffer 45.

A delay time (system of CAP-out) from the pulse control circuit 43 to the input/output buffer 45 is set so as to reach substantially the same delay time as a clock output system pass (system of clock CK-out). Similarly, a delay time (system of CAP-in) from the input/output buffer 45 to the delay time determination circuit 44 is set so as to be substantially identical to a delay time (system of DQS-in) from an input/output buffer 18 for the strobe signal DQS to a phase shift circuit 27.

The delay time (system of DQS-in) from the input/output buffer 18 for the strobe signal DQS to the phase shift circuit 27, and a delay time (system of DQ-in) from an input/output buffer 17 for the data DQ to a sampling circuit 28 are set so as to be substantially the same.

The test pulse CAP-out is outputted from the pulse control circuit 43, and its signal is inputted to the delay time determination circuit 44 as a return pulse CAP-in via the input/output buffer 45 placed under the load of the capacitor 40. The delay time determination circuit 44 measures the delay time until the return pulse CAP-in is returned. The delay time becomes equivalent to a delay time required until each of the signals DQ and DQS reaches a memory interface circuit 3A. Information about the delay time is set to a hold circuit 26 in breaks (refresh cycle, memory write cycle, etc.) of a bus cycle. Using the set information, the signals DQ and DQS are synchronized to the internal clock. The delay time determination circuit 44 is basically identical in configuration to the delay time determination circuit 25 described in FIG. 6. That is, the input signal may be changed from DQS-in to CAP-in in the configuration shown in FIG. 6. Incidentally, functional blocks each having the same function as FIG. 1 are identified by like reference numerals and their detailed description will therefore be omitted.

Figure 12:
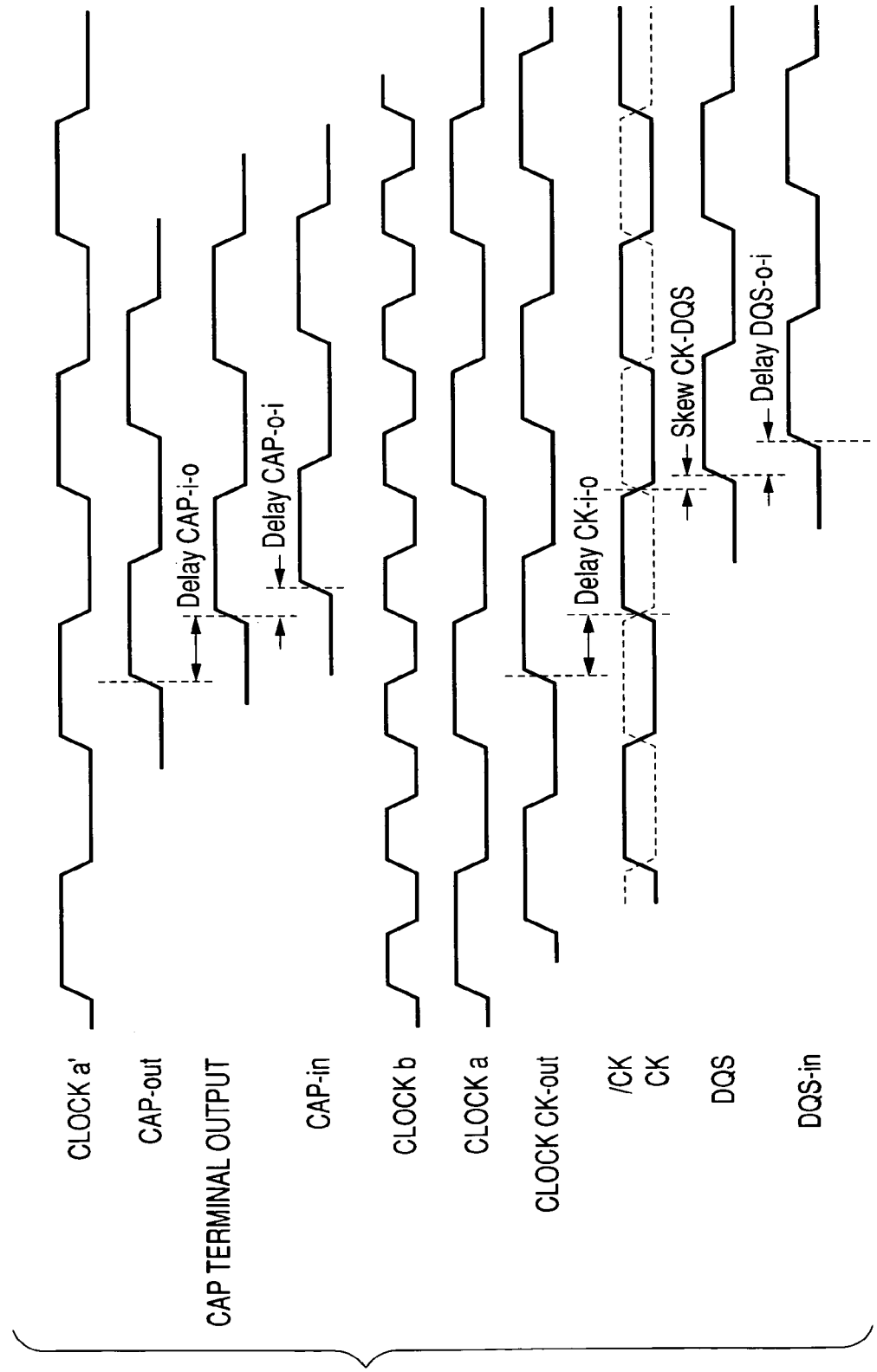
FIG. 12 is a timing chart illustrating a synchronization operation using a dummy capacitor.

A timing chart illustrating a synchronization operation using a dummy capacitor is shown in FIG. 12. In the same drawing, a Delay CAP-i-o designates a delay time from the pulse control circuit 43 to the output of the input/output buffer 45 in the state in which the load of the capacitor 40 is being connected. A Delay CAP-o-i designates a delay time from the CAP terminal 41 to the delay time determination circuit 44 via the input/output buffer 45. A Skew CK-DQS designates the difference between change timing for CK and change timing for each of the signals DQ and DQS in the DDR-SDRAM 6 connected to the outside. In the general-purpose DDR-SDRAM 6 using DLL for the DQS output, the difference is approximately ±subnano seconds. A Delay DQS-o-i designates a delay time from a DQS terminal 22 to the phase shift circuit 27 via the input/output buffer 18.

Figure 13:
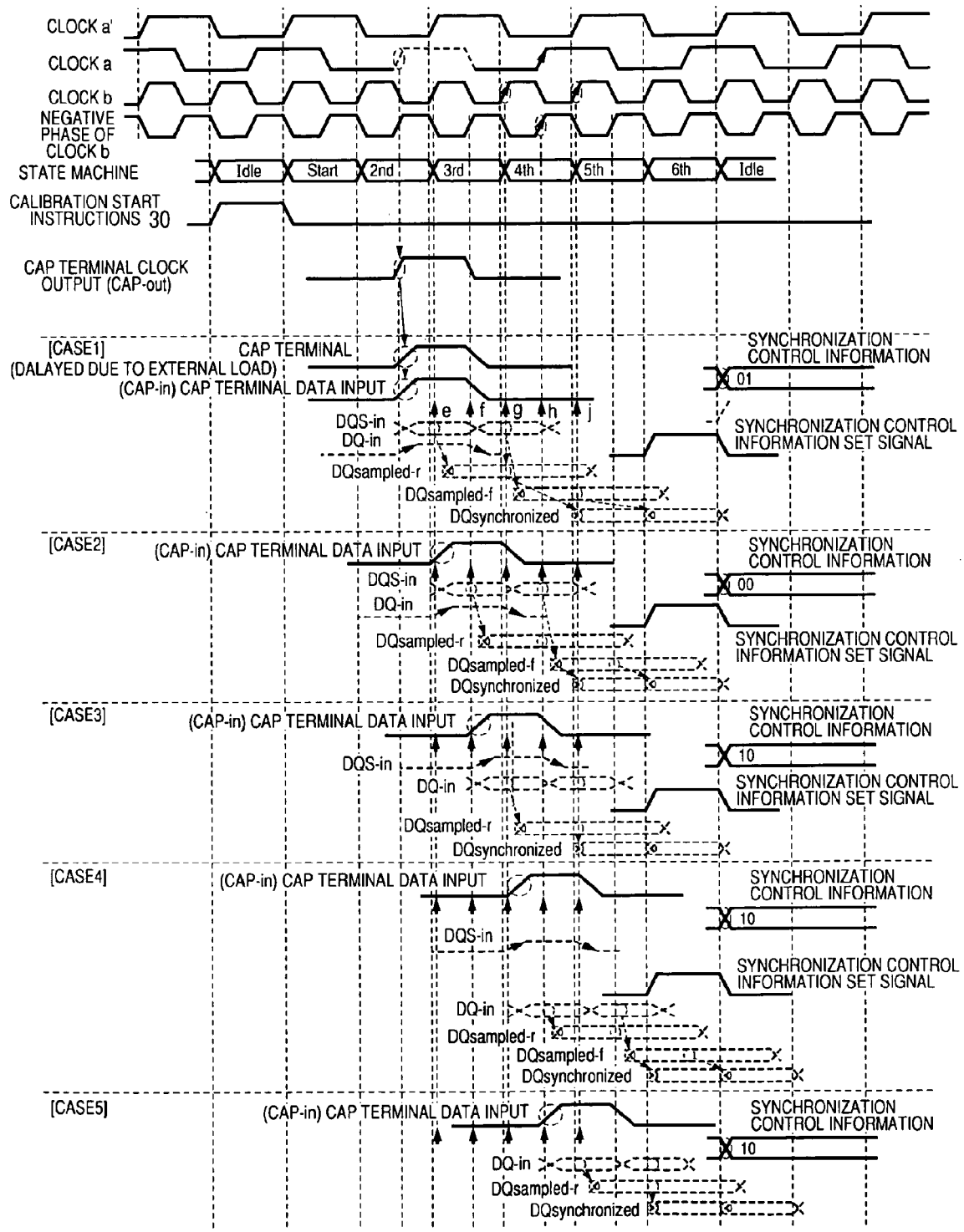
FIG. 13 is a timing chart showing determining operations by a delay time determination circuit shown in FIG. 11.

Timings provided for determination by the delay time determination circuit 44 are shown in FIG. 13. Five types of cases are considered according to the delay time of the pulse signal sent via the CAP terminal. A loop-backed test pulse signal CAP-in is determined based on five timings of e, f, g, h and j, whereby timing in which 1 is inputted, is determined. The process of synchronizing DQ-in and DQS-in in each of the CASE1 through CASE5 each corresponding to the result of determination is identical to one described in FIG. 7.

According to the above means, a delay time measurement system equivalent to a transfer system of the memory clock signal CK, which is different from an input system of the data strobe signal DQS, i.e., a delay time measurement system configured of the CAP-out, buffer 45, terminal 41, capacitor 40 and CAP-in is provided to recognize the arrival timing of the clock signal with respect to the DDR-SDRAM 6 without matching the phases of the clock CK supplied to the DDR-SDRAM 6 and the internal clock. The timing for the signal DQ fetched from the DDR-SDRAM 6 is compensated by information obtained from the delay time measurement system.

The capacitance 40 equivalent to the input capacitance of the external clock terminal 20 in the transfer system of the memory clock signal CK and the capacitance of each clock wiring on a wiring board with the DDR-SDRAM 6 or the like packaged thereon is disposed in the shortest distance to the equivalent delay time measurement system so as not to cause reflection and configured as the load for the equivalent delay time measurement system. Thus, the load equivalent to the original input system of the memory clock signal CK is applied and the same delay time as it can be measured. The DDR-SDRAM 6 is equipped with the DLL circuit and outputs signals like a data strobe signal DQS and read data DQ under the action thereof in synchronization with the cross-point of the memory clock signals (CK and /CK) supplied from the memory interface 3 side to the DDR-SDRAM 6. By measuring the timings for the memory clock signals (CK and /CK) supplied to the DDR-SDRAM 6, change timings provided for the signals like the read data and data strobe signal are determined. This is because the respective load components or delay components of the system of transfer of the clock signal between the data processor 1 and the DDR-SDRAM 6 and the simulation-measuring transfer system are made substantially identical to each other. The measured information can be used as synchronization control information CNTsync inside the memory interface circuit 3. The timings provided to operate the DDR-SDRAM 6 can be recognized without concern for a problem such as reflection. Adjusting the equivalent capacitance constituting the equivalent delay time measurement system configured outside enables fine adjustments or the like to the timings.

<<Phase Shift Circuit>>

Figure 14:
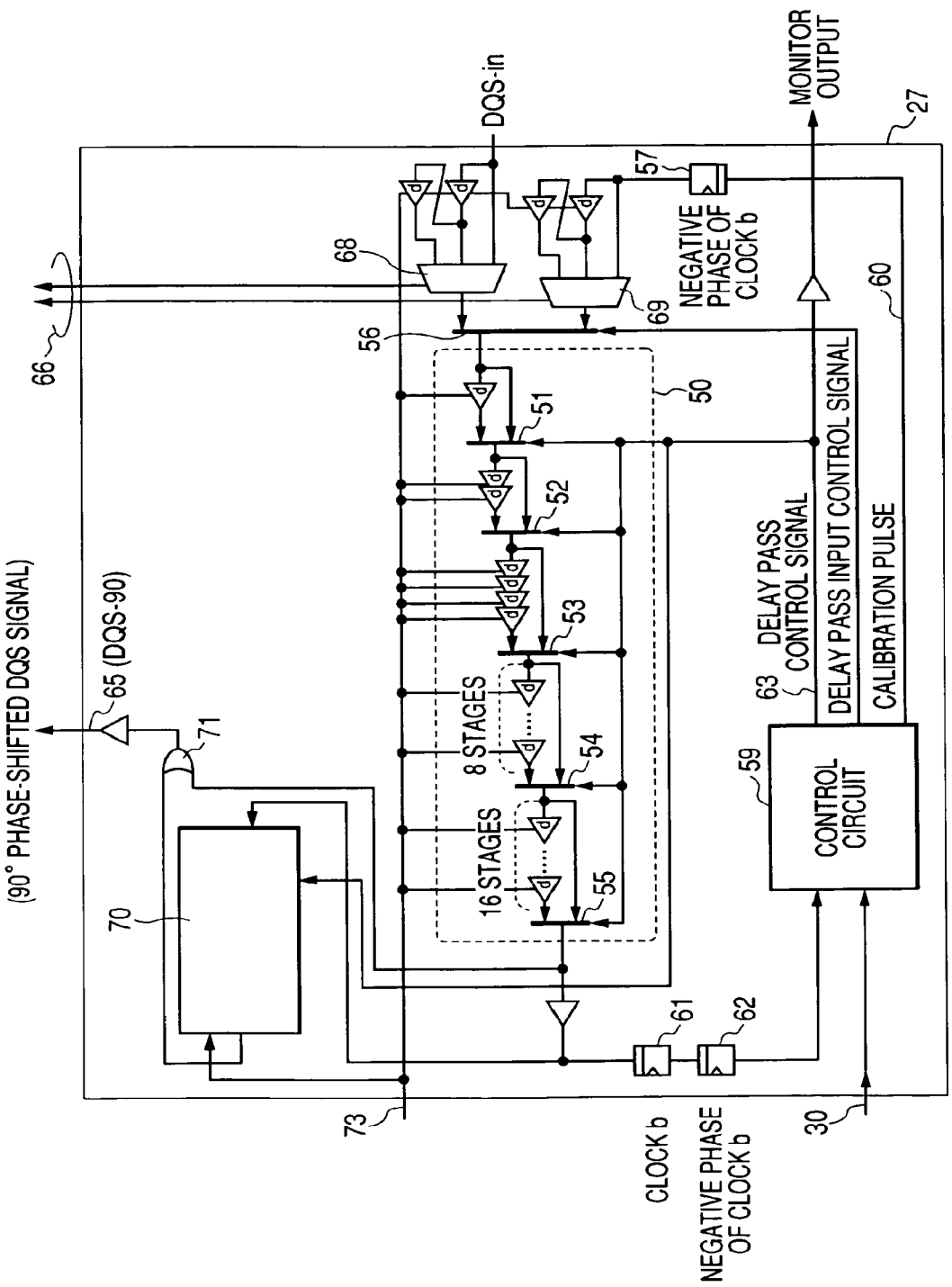
FIG. 14 is a block diagram showing a specific example of a phase shift circuit.

A specific example of the phase shift circuit 27 is shown in FIG. 14. The phase shift circuit 27 has a variable delay circuit 50. The variable delay circuit 50 is capable of sequentially selecting passes or paths passing through delay stages d corresponding to 32 stages by a split-half method and variably setting delay times. The passes are selected by selectors 51 through 55 respectively. A strobe signal DQS-in or a signal outputted from a flip-flop 57 is selected by the selector 56 and supplied to the input stage of the variable delay circuit 50. The flip-flop 57 is supplied with a calibration pulse 60 sent from a control circuit 59 and latches it in the form of an antiphase or positive phase of a clock b. The output of the variable delay circuit 50 is fed back to the control circuit via flip-flops 61 and 62. The flip-flop 61 latches the input in the form of a positive phase of the clock b, and the flip-flop 62 latches the input in the form of the positive phase of the clock b. When the control circuit 59 receives calibration instructions through a calibration instruction signal 30, the control circuit 59 causes the selector 56 to select the output of the flip-flop 57 and supplies the calibration pulse 60 to the flip-flop 57. The passes for the delay stages are sequentially switched by the split-half method through a pass control signal 63 each time the calibration pulse 60 is outputted, and the calibration pulse 60 is feedback-inputted to the control circuit 59 via the flip-flops 61 and 62 for each switching. The latch timings of the flip-flops 61 and 62 have shifts in latch timing, corresponding to a 180° phase shift of the clock b and a 90° phase shift of a clock a, i.e., strobe signal DQS-in. Thus, the time delay at the time that the data latched in the flip-flop 61 is changed from inversion to non-inversion, is set to the variable delay circuit 50, so that the signal outputted from the variable delay circuit 50 is brought to a signal 90° phase-shifted with respect to the strobe signal DQS-in.

Figure 15:
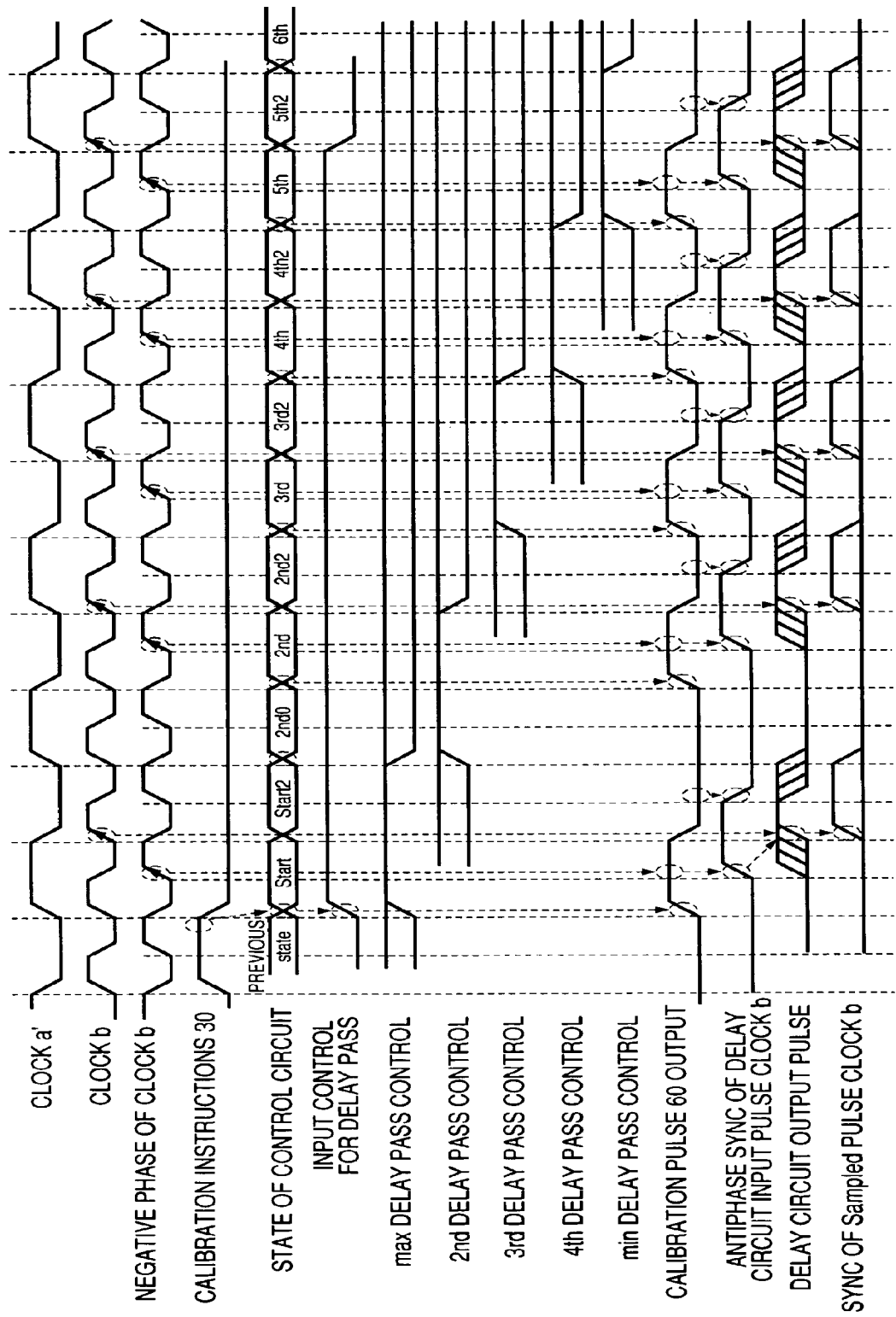
FIG. 15 is a timing chart illustrating operating timings for selecting delay passes of a variable delay circuit by a split-half method to set delay times.
Figure 17:
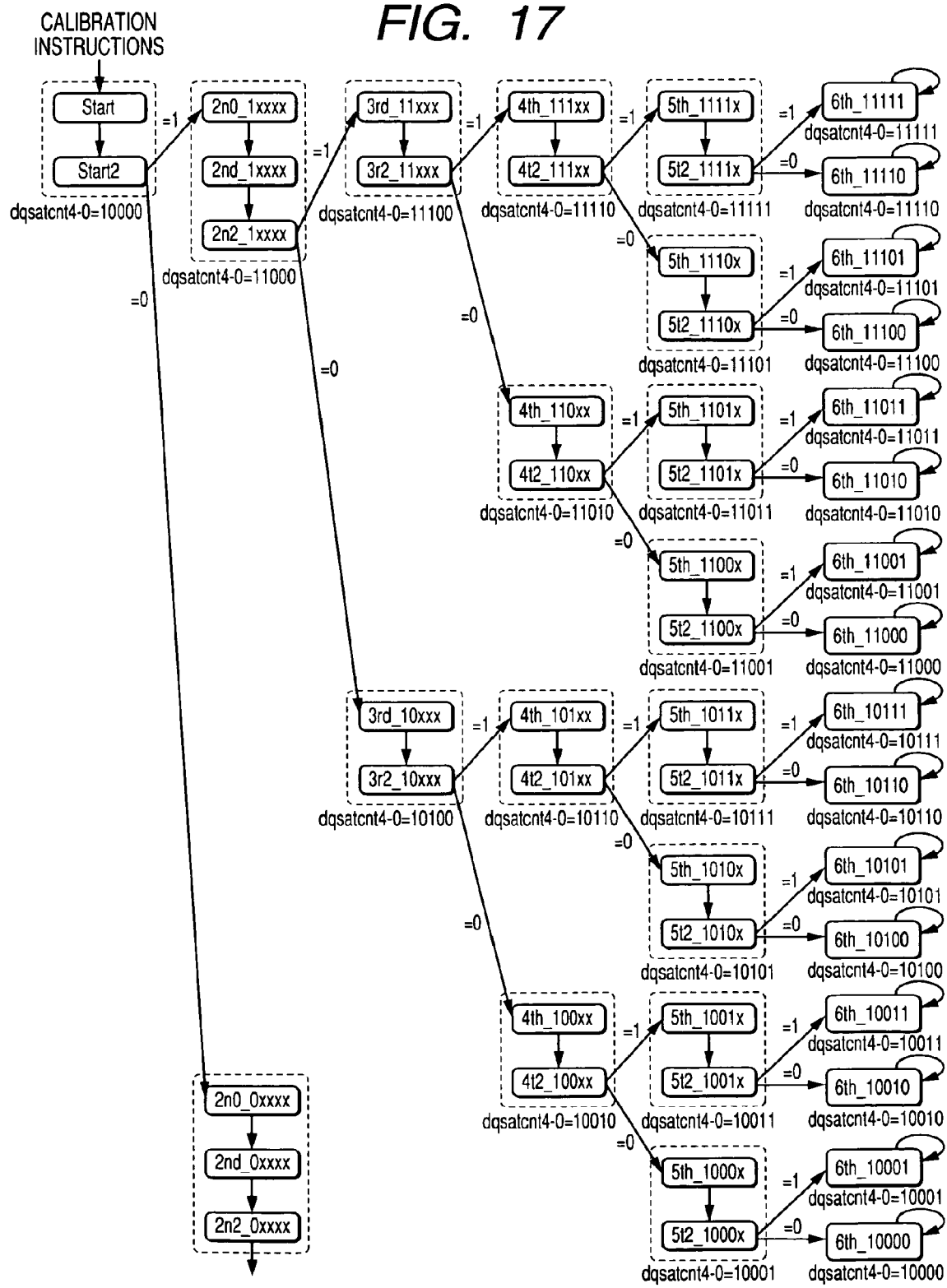
FIG. 17 is a flowchart showing part of a state control flow of a control circuit which performs a delay time setting process by the split-half method.

In order to set such a delay time, the delay passes of the variable delay circuit 50 are selected by the split-half method. Described specifically, the delay time is first set to one-half the longest delay time. The next delay time is set to ¼ or ¾ depending on whether a pulse sent via its delay circuit has been in time for sampling of the flip-flop 61. Further, the delay time is sequentially adjusted in fines like ⅛ or ⅜, or ⅝ or ⅞. Operating timings for selecting the delay passes are illustrated in FIG. 15 by way of example. In the present example, 2 cycles of a clock b constitute one calibration cycle. The calibration of the delay time is completed by repeating the calibration cycle by 6 cycles (in 12 clock cycles of clock b). The order of selecting delay passes by the split-half method is shown in FIG. 16. 0 through 31 indicated in the horizontal section means delay pass numbers, and 1st through 6th indicated in the vertical section means calibration cycle numbers. Part of a state control flow of the control circuit which performs a delay time setting process by the split-half method, is illustrated in FIG. 17. Since a state flow in the direction transitioned in the case of=0 in the first control state is similar to the case of=1, its illustration is omitted.

When the calibration is brought to completion, the input selector 56 selects the input side of the strobe signal DQS-in. Thus, the inputted strobe signal DQS-in is delayed by a time interval equivalent to the 90° phase-shift, which in turn is outputted to the sampling circuit 28 as a 90° phase-shifted strobe signal (DQS-90) 65. The sampling circuit 28 samples data DQ-in in synchronization with the strobe signal 65.

A timing fine-control instruction signal 66 serves so as to select the inputs of selectors 68 and 69 to compensate for shifts in the delay time from the flip-flop 57 for calibration to the flip-flop 61 and the delay time from the strobe signal DQS-in corresponding to the original pass to the 90° phase-shifted strobe signal 65 to thereby perform fine-adjustments to the delay time. A timing fine-control instruction signal 73 is an instruction signal for fine-adjusting the delay times of the respective delay stages where the delay time of the variable delay circuit 50 is not brought to a desired delay value.

Further, another variable delay circuit 70 is series-connected to the variable delay circuit 50. The outputs of both variable delay circuits 50 and 70 are inputted to an OR gate 71 whose output is outputted as the 90° phase-shifted strobe signal 65. This aims to remove such a value that the strobe signal DQS-in becomes indefinite upon completion of a bus cycle, so as to avoid sampling of false data generated at that time. Although the duty of the phase-shifted strobe signal 65 changes with respect to the normal duty owing to this, it is considered that a substantial adverse effect is not exerted even if the additional variable delay circuit 70 is set identical to the variable delay circuit 50. The additional variable delay circuit 70 may be omitted or can also be replaced with a fixed delay circuit or the like.

Figure 18:
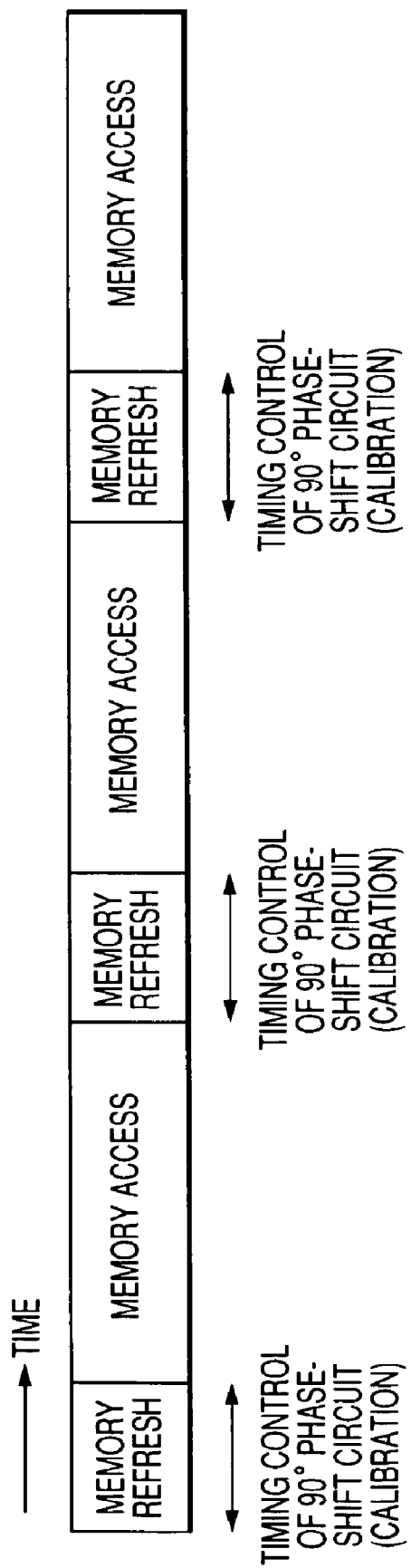
FIG. 18 is an explanatory diagram showing a relationship between timing control operations for delay times in the phase shift circuit and memory access operations.

A relationship between timing control operations for delay times in the phase shift circuit and memory access operations is shown in FIG. 18. During a memory refresh, calibration (timing control) of the 90° phase-shift circuit is carried out and a memory access may be done based on the controlled or adjusted value.

Figure 19:
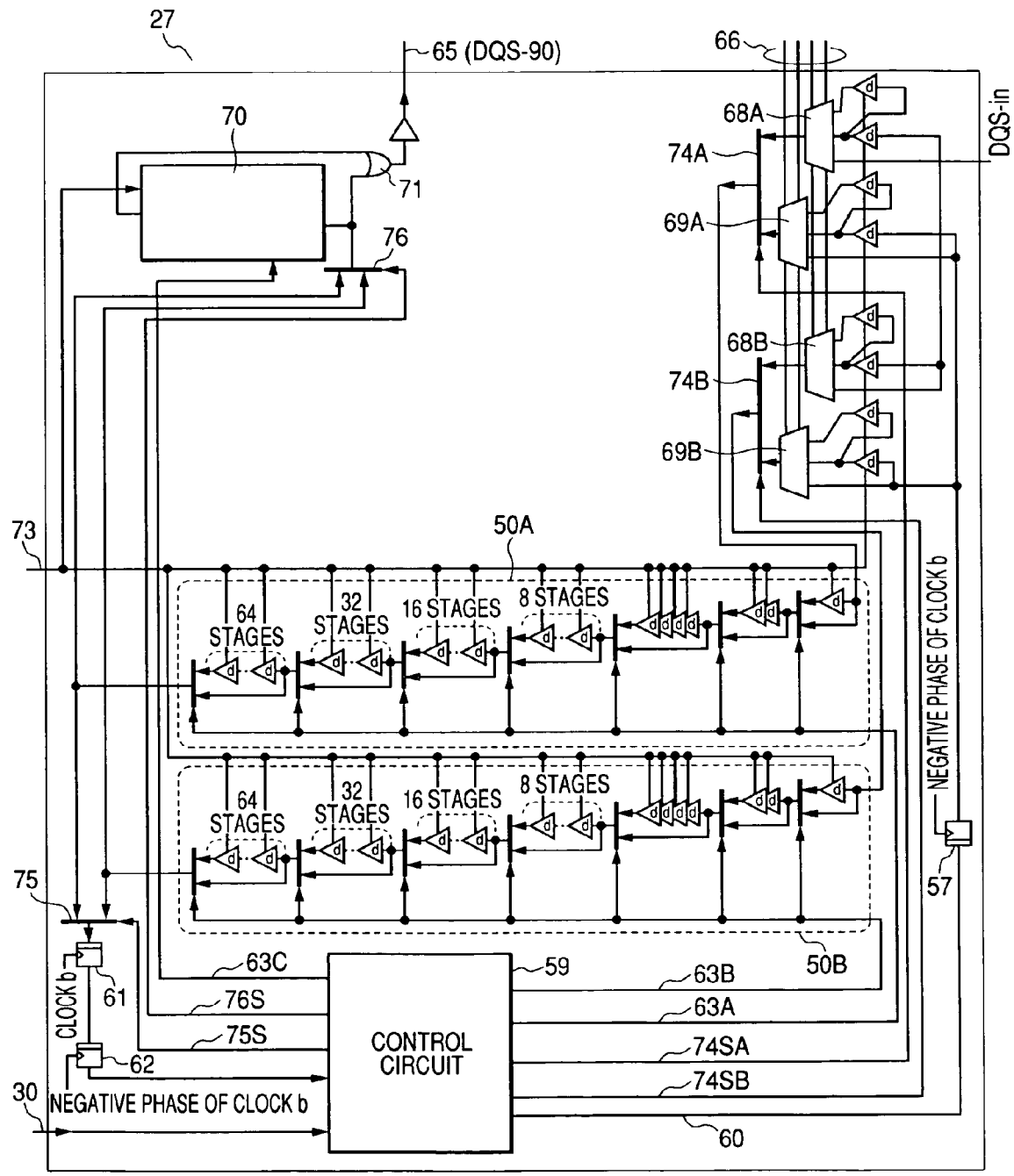
FIG. 19 is a block diagram showing a phase shift circuit configured so as to be capable of performing delay time setting in further details.

A phase shift circuit configured so as to be capable of performing delay time setting in further details is shown in FIG. 19. The phase shift circuit 27 shown in the same drawing is different from one shown in FIG. 14 in that two variable circuits 50A and 50B respectively having delay stages d corresponding to 64 stages are provided and correspondingly input selectors 74A and 74B for selecting whether to input a calibration pulse 60 and a strobe signal DQS-in to either the variable delay circuit 50A or 50B, a calibration switching selector 75 for selecting whether to use the output of either the variable delay circuit 50A or 50B for calibration of delay time control, and a shift output switching selector 76 for selecting whether to use the output of either the variable delay circuit 50A or 50B for a phase shift operation. A control circuit 59 performs selection control on the selectors 74A, 74B, 75 and 76. Delay pass control signals 63A and 63B are individually supplied to the variable delay circuits 50A and 50B. Reference numerals 74SA, 74SB, 75S and 76S are selection control signals for the selectors 74A, 74B, 75 and 76.

Figure 20:
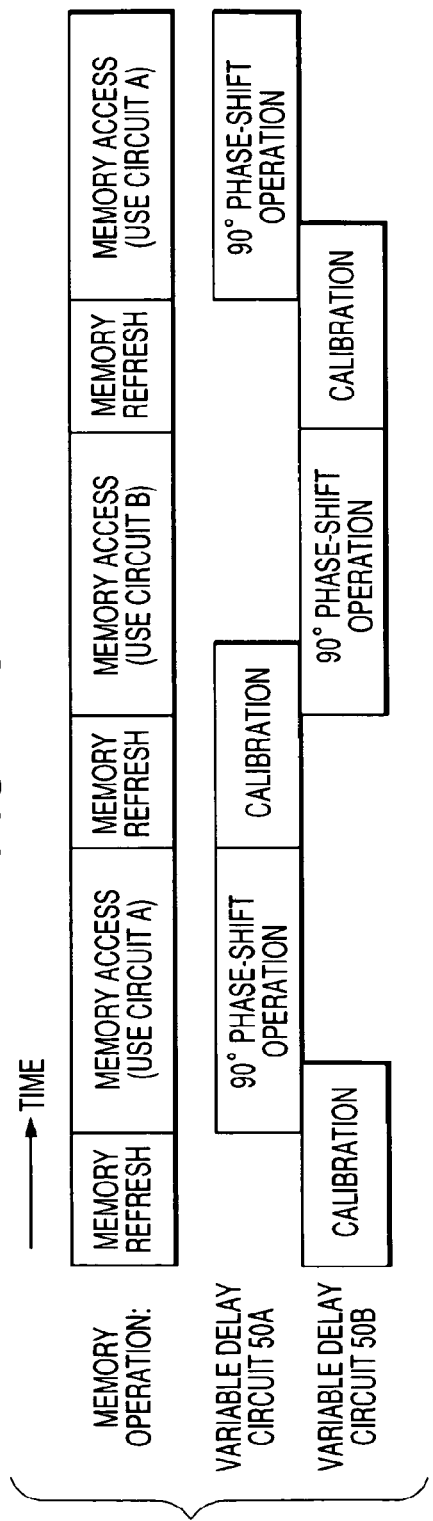
FIG. 20 is an explanatory diagram showing operation states in which, in consideration of a case in which the number of stages of delay elements need a lot and a large number of clock cycles are necessary for control on a case where the variable delay circuits are used, calibrations for setting delay times with respect to a pair of variable delay circuits and phase shift operations are performed by alternate switching according to calibration results.

Each of the variable delay circuits 50A and 50B needs a large number of stages of delay elements d as compared with the variable delay circuit 50 shown in FIG. 14 and requires a larger number of clock cycles for control. Therefore, it is conceivable that the calibration for delay time setting to the variable delay circuits 50A and 50B will not fall within a memory refresh period or the like free of the occurrence of a memory access as shown in FIG. 20. To cope with it, the variable delay circuits 50A and 50B are alternately used by switching in such a manner that upon calibration of the variable delay circuit 50A, the variable delay circuit 50B is used to carry out the memory access, whereas upon calibration of the variable delay circuit 50B in reverse, the variable delay circuit 50A is used to carry out the memory access. Thus, even if the variable delay circuits are brought into high accuracy as in 50A and 50B and the calibration time is increased, apparent operation timings can be concealed with no change thereof. Thus, since no needless adjustment time is used while high-precision timing control is being performed, a high-performance stable system can be constructed while ensuring system performance.

Figure 21:
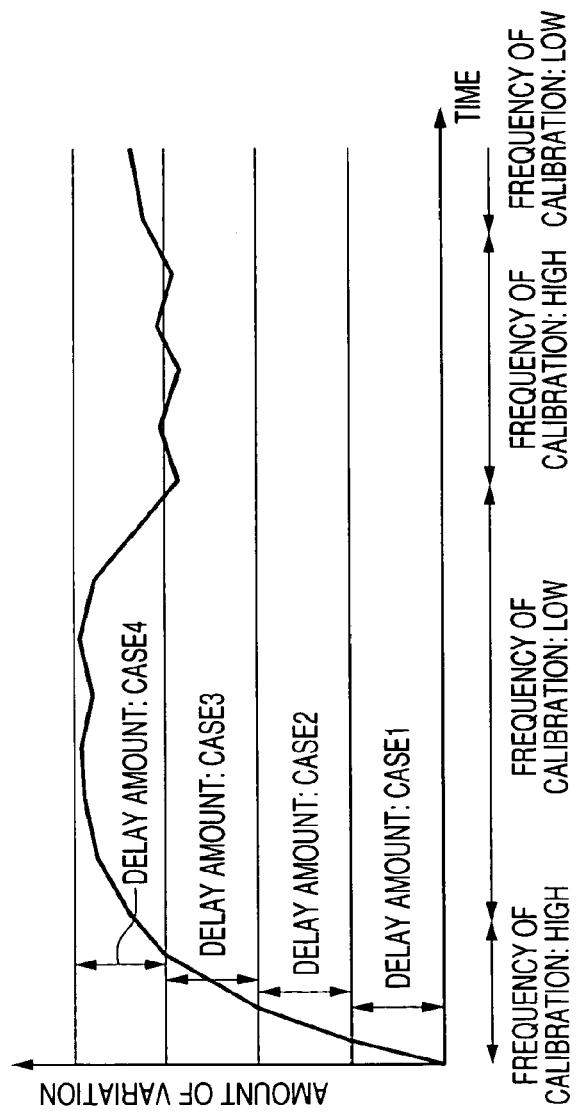
FIG. 21 is an explanatory diagram illustrating a state of changes of the amounts of variations in delay with respect to the passage of time.

Changes in the amounts of variations in delay with respect to the passage of time are shown in FIG. 21. When the delay times fall within the ranges of respective CASE1 through CASE4 of delay amounts, frequent calibrations with respect to the delay time determination circuit 25 and the phase shift circuit 27 are unnecessary (power consumption can also be suppressed). However, when the delay amounts greatly vary due to some kind of factor, and in the vicinity of the boundary between the respective CASEs, frequent calibrations become necessary.

Figure 22:
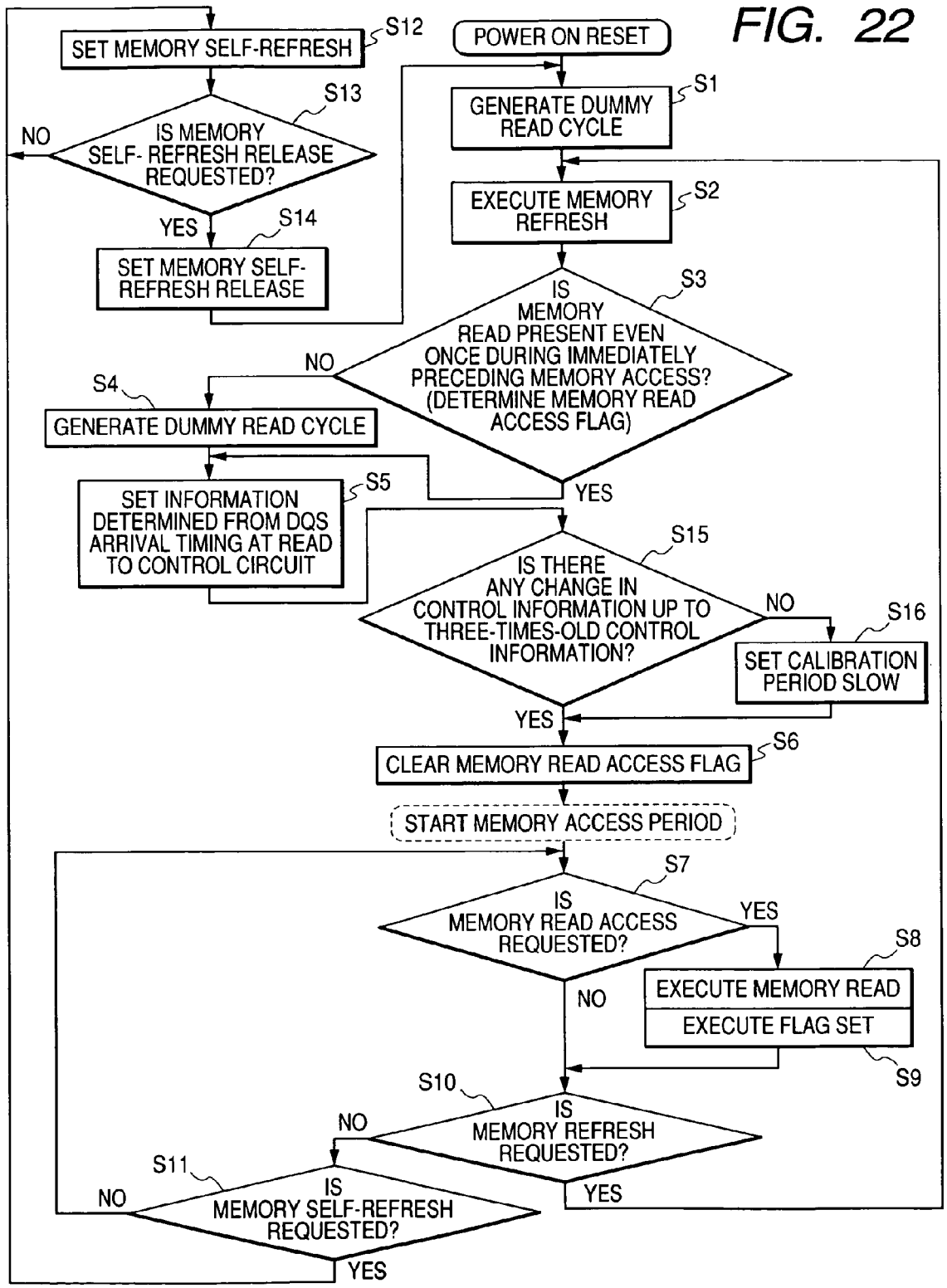
FIG. 22 is a flowchart showing one example of an operation which adopts calibration period control having taken into consideration the delay variations described in FIG. 21.

One example of calibration period or cycle control having taken into consideration the delay variations described in FIG. 21 is shown in FIG. 22. A flowchart according to the present example is different from the flowchart shown in FIG. 10 in that Steps S15 and S16 are inserted following Step S5. It is determined whether when the value held in the hold circuit 26 is updated in accordance with the delay information (synchronization control information) CNTsync obtained in Step S1 or S4, the synchronization control information CNTsync has changed with respect to three-times-old synchronization control information CNTsync (S15). When no change occurs, the calibration period is set slow. That is, it is possible to arbitrarily adjust and set delay times to perform subsequent calibrations by reference to the previous result of determination (S16). This control may be performed by the external memory controller 4. Although the calibration of the phase shift circuit 27 has not been mentioned in the descriptions of FIGS. 10 and 22, the calibration for the phase shift is actually started in the refresh cycle as described in FIGS. 18 and 20. The calibration for the phase shift is started in the refresh cycle at Step S2 of FIG. 22, for example. Thus, the calibration cycle of FIG. 22 is applied even to the calibration of the phase shift circuit 27 together with the delay time determination circuit 25.

When, for example, changes such as a change in temperature, etc. converge and a change in delay information (control information) is less reduced, the frequency of calibration is reduced according to the control procedure of the flowchart shown in FIG. 22. It is thus possible to suppress power consumption and lessen the emission of noise.

While the invention made above by the present inventors has been described specifically based on the embodiments, the present invention is not limited to them. It is needless to say that various changes can be made thereto within the scope not departing from the gist thereof.

For instance, the double data rate type synchronous memory is not limited to the DDR-SDRAM. It can be applied even to a memory having other storage form, such as a static type or the like. A semiconductor integrated circuit is not limited to the data processor but can be widely applied to a semiconductor device called a microcomputer, a microprocessor or a system LSI or the like.

What is claimed is:

1. A semiconductor integrated circuit comprising:
    memory interface means for interfacing with a synchronous memory;
    data processing means for processing data;
    clock generating means for generating clock signals; and
    memory controlling means coupled to said memory interface means and for performing access control on the synchronous memory which outputs read data in synchronization with a data strobe signal,
    wherein said memory interface means is configured to be coupled to the synchronous memory,
    wherein said clock generating means generates an internal clock signal and a memory clock signal for supply to the synchronous memory,
    wherein said memory interface means determines an arrival delay of a data strobe signal received in a read cycle of the synchronous memory relative to the internal clock signal, samples read data of the read cycle based on a signal obtained by shifting the phase of the received data strobe signal, and synchronizes the sampled read data to the internal clock signal based on a result of the determination of the arrival delay,
    wherein said memory interface means is controlled by the memory controlling means to determine the arrival delay in the read cycle of the synchronous memory, and
    wherein said memory interface means is configured to provide the result of determination of the arrival delay to a synchronizing circuit of said memory interface means during a predetermined period in which no read cycle occurs with respect to the synchronous memory.

2. The semiconductor integrated circuit according to claim 1, wherein said memory interface means generates a dummy read cycle to determine the arrival delay when no read cycle occurs during a predetermined refresh interval of the synchronous memory.

3. The semiconductor integrated circuit according to claim 1, wherein said memory interface means generates a dummy read cycle to determine the arrival delay in response to a power-on reset.

4. The semiconductor integrated circuit according to claim 1, wherein said predetermined period is a refresh cycle of the synchronous memory.

5. The semiconductor integrated circuit according to claim 1, wherein the read cycle to determine the arrival delay is carried out in a predetermined timing, arbitrarily determined based on a result of determination in another read cycle in which arrival delay previously has been determined.

* * * * *